US 6,669,752 B2

(12) United States Patent
Arnold et al.

(10) Patent No.: US 6,669,752 B2
(45) Date of Patent: Dec. 30, 2003

(54) SMALL PARTICLE POLYACRYLAMIDE FOR SOIL CONDITIONING

(75) Inventors: Charles A. Arnold, Englewood, CO (US); Arthur Wallace, Los Angeles, CA (US)

(73) Assignee: Soil Enhancement Technologies, Centennial, CO (US)

(*) Notice: Subject to any disclaimer, the term of this patent is extended or adjusted under 35 U.S.C. 154(b) by 0 days.

(21) Appl. No.: 10/156,313

(22) Filed: May 28, 2002

(65) Prior Publication Data

US 2003/0051522 A1 Mar. 20, 2003

Related U.S. Application Data

(62) Division of application No. 09/356,271, filed on Jul. 16, 1999, now Pat. No. 6,395,051, which is a continuation-in-part of application No. 09/290,484, filed on Apr. 12, 1999, now Pat. No. 6,227,473, which is a continuation of application No. 08/897,015, filed on Jul. 18, 1997, now abandoned.

(60) Provisional application No. 60/093,269, filed on Jul. 17, 1998.

(51) Int. Cl.$^7$ .............................. C05C 11/00; C09K 3/00

(52) U.S. Cl. ................ 71/27; 47/58.1 SC; 47/DIG. 10; 71/64.1; 71/903; 252/363.5

(58) Field of Search ............................ 71/27, 64.1, 903; 47/58.1 SC, DIG. 10

(56) References Cited

U.S. PATENT DOCUMENTS

| | | | |
|---|---|---|---|
| 2,625,529 A | 1/1953 | Hedrick et al. | |
| 2,652,380 A | 9/1953 | Hedrick et al. | |
| 3,900,378 A | 8/1975 | Yen et al. | |
| 4,035,317 A | 7/1977 | Gershberg | |

(List continued on next page.)

FOREIGN PATENT DOCUMENTS

| | | |
|---|---|---|
| EP | 0 181 983 A | 5/1985 |
| GB | 289889 | 5/1929 |
| GB | 2 088 248 A | 6/1982 |
| GB | 2 267 398 A | 5/1986 |
| JP | 141693 | 6/1986 |

OTHER PUBLICATIONS

A. Wallace et al., "Need for Solution or Exchange Calcium and/or Critical EC Level for Flocculation of Clay by Polyacrylamides," Proc. Conf. at Coll. S. Id. Twin Falls May 6–8, 1996, p. 59–63 U.Id. Misc. Pub. 101–96.

(List continued on next page.)

Primary Examiner—Wayne A. Langel
(74) Attorney, Agent, or Firm—Jonathan Wainer

(57) ABSTRACT

A method of producing an aqueous solution of water-soluble polyacrylamide (PAM) with a concentration of at least about 5 grams per liter includes the steps of providing a monovalent or divalent cation salt solution, and preferably a calcium salt solution, and adding water-soluble PAM particles to the salt solution such that the PAM particles are essentially all dissolved within about 10 seconds. The PAM particles are characterized by a particle size that is about −100 mesh and consisting essentially of molecules having a molecular weight of at least about 15 million a.u. Preferably, the small PAM particles are produced by a mill that produces bulk quantities of small dry, flowable PAM particles from larger commercial grade particles. Small PAM particles produced in such a mill are essentially all soluble in plain water within about 10 seconds. After solution, the polymer concentrate can be diluted with water to make stock solutions of the polymer for some purposes. For other purposes the concentrate can be injected directly into irrigation systems. Effectiveness of the water-soluble polyacrylamide as a soil conditioner is considerably increased by co-use with a calcium salt, gypsum, fertilizer salts, or a combination of these salts, in addition to the increased ease of making solutions.

15 Claims, 9 Drawing Sheets

U.S. PATENT DOCUMENTS

| | | | |
|---|---|---|---|
| 4,214,712 A | | 7/1980 | van Hoorn |
| 4,218,012 A | | 8/1980 | Hamza et al. |
| 4,518,261 A | | 5/1985 | Sekimoto et al. |
| 4,559,074 A | * | 12/1985 | Clarke .......................... 71/27 |
| 4,797,145 A | | 1/1989 | Wallace et al. |
| 5,127,187 A | * | 7/1992 | Hattori et al. ................ 71/903 |
| 5,332,524 A | * | 7/1994 | Kaylor .................... 252/363.5 |
| 5,450,985 A | | 9/1995 | Meuleman |
| 5,548,020 A | | 8/1996 | Santini et al. |
| 5,580,168 A | | 12/1996 | Alireza et al. |
| 5,605,970 A | | 2/1997 | Selvarajan |
| 5,637,556 A | | 6/1997 | Argillier et al. |
| 5,837,776 A | | 11/1998 | Selvarajan et al. |
| 5,885,032 A | * | 3/1999 | Mallon et al. ................ 71/903 |

OTHER PUBLICATIONS

R.E. Sojka et al., "Water Management with Multiple Applications of Polyacrylamide in Furrow Irrigation." Soil Sci. Soc. Am. J., v. 62, Nov.–Dec. 1998, p. 1672–1680, Madison, Wisc.

M. Ben–Hur et al., "Polymer Effects on Water Infiltration and Soil Aggregation," Soil Soc. Am. J., v. 61, p. 565–570, Mar.–Apr. 1997, Madison, Wisc.

A. Wallace et al., "Effects of Very Low Rates of Synthetic Soil Conditioners on Soils," Soil Sci., v. 141 p. 324–327, May 1996, Baltimore, MD.

* cited by examiner

SMALL PARTICLE POLYACRYLAMIDE FOR SOIL CONDITIONING

CROSS REFERENCE TO RELATED APPLICATIONS

This application is a division of patent application Ser. No. 09/356,271, filed July 6, 1999, U.S. Pat. No. 6,395,051, and also claims the benefit of Provisional Application Ser. No. 60/093,269, filed Jul. 17, 1998, to Arthur Wallace and entitled "Rapid Solution Of Water-Soluble Polymers With Simultaneously Increased Effectiveness For Soil Conditioning," the entire disclosure of which is included herein by reference. Application Ser. No. 09/356,271 is also a continuation-in-part of patent application Ser. No. 09/290,484, filed Apr. 12, 1999, U.S. Pat. No. 6,227,473, which is a continuation of Ser. No. 08/897,015, filed Jul. 18, 1997 and now abandoned, both to Charles A. Arnold and both entitled "Apparatus And Methods For Pulverizing Material Into Small Particles."

BACKGROUND OF THE INVENTION

This application relates to methods of producing flowable, small-particle size, high molecular weight, water-soluble polyacrylamide from larger size particles, improved methods for making solutions of the polyacrylamide, and their uses for soil conditioning.

Water-soluble polyacrylamide (PAM) and other water soluble polymers are used as soil conditioners because they help form and protect soil aggregates by binding to clay particles in the soil. Among the benefits, this property helps to control wind and water erosion, improve water infiltration and retention, improve soil aeration, and inhibit crusting or sealing. One use is in forestry, wherein granules of PAM are mixed into soil into which seedlings are planted. Water-soluble PAM is a long-chain molecule, which is distinguished from an insoluble cross-linked form of PAM that is used for different purposes. This disclosure relates to the water-soluble variety of PAM, which will also be referred to herein simply as PAM.

Water-soluble PAM with the most desirable properties for soil conditioning has a molecular weight of about 15–22 million a.u. (atomic units), and is about 20% anionic. Water-soluble PAM of this molecular size is commercially available in granule sizes of about +60, −25 mesh (between 250 and 600 $\mu$m), and, more typically, essentially not smaller than +40 mesh (>450 $\mu$m) sizes. PAM of this type, which comprises an anionic linear copolymer of acrylamide and sodium acrylate, is available under the trade name FLO-BOND A30 from Chemtall, Inc. of Riceboro, Ga. The water-soluble granules appear to be aggregates of many molecules and have a very irregular shape, as shown in FIG. 1A. Under an optical microscope, flat crystal faces are visible, and the particles appear translucent. Some small portions of the granules, e.g. dark areas in FIG. 1A, appear transparent. The granules are probably not entirely clear because of included fractures and other defects, which will scatter light.

Severe barriers exist to more widespread use of water-soluble PAM in soil. When dry granules of PAM of standard commercial sizes are applied to agricultural soil at reasonable economic rates, the soil typically is nonuniformly conditioned because the dry granules are too far apart to fully condition soil. For example, when 10 pounds (4.5 kg) of the standard size water-soluble PAM are mixed into an acre of soil to a uniform depth of six inches (15 cm), each pound (0.45 kg) of soil will contain on average only about 22 particles of water-soluble PAM. Each ounce (28.4 grams) of soil would contain only about 1–2 particles.

Applying water-soluble PAM in solution is more effective than dry granule application because it produces a more uniform spatial distribution of the PAM in the soil. Therefore, solution application requires less PAM than does application of granules for favorable results. Another benefit of using a solution of PAM is that it can be applied to soil through standard irrigation systems. However, the commercially available PAM granules have a slow and low solubility in water. These solubility charateristics make it difficult to obtain sufficiently concentrated stock solutions of water-soluble PAM to be economically useful when injected into irrigation lines. Full solution time for standard sized granules can be an hour or more but many dealers and manufacturers say that it is best to allow the water-soluble PAM to sit overnight in water to fully dissolve in a stock solution. This is too long to be practical for most large scale agricultural purposes.

Generally, stock solutions of around 2,000 to 3,000 parts per million (ppm) by weight (mg/liter) water-soluble PAM in water are the most concentrated that can be conveniently made with conventional procedures. When fertilizer salts are included, somewhat higher concentrations, e.g. up to about 12,000 ppm, are possible. The presence of fertilizer solutes will also help PAM go into solution somewhat more rapidly. For example, solution concentration can be improved by disssolving PAM in various fertilizer salt solutions, as described in U.S. Pat. No. 4,797,145, to Wallace, et al. However, the solution rate generally remains slower than desirable because of the large particle sizes. An hour or more is typically required to achieve the higher concentrations even with the use of fertilizer salts.

Co-application of dry PAM with some divalent calcium helps the water-soluble PAM to bridge with or react with clay to add stability to soil aggregates, as described "Need for Solution or Exchangeable Calcium and/or Critical EC Level for Flocculation of Clay by Polyacrylamides," by Wallace and Wallace, in "Proceedings: Managing Irrigation-Induced Erosion and Infiltration with Polyacrylamide," Univ. Idaho Misc. Pub No. 101-96, pp. 59–63, 1996. This enhances the soil conditioning value. To achieve this, solution-grade gypsum of −200 mesh particle size (<75 $\mu$m), which is typically composed mostly of calcium sulfate dihydrate, can be applied to soil before addition of water-soluble PAM, or gypsum and water-soluble PAM are applied together in solution after each is dissolved separately. But gypsum also has a low solubility, which limits its use.

Using water-soluble PAM in solution for liquid application to soil entails high handling costs. It generally requires bulk equipment that is not easily portable to fields because large volumes of stock solution are needed for large fields. The PAM granules of the size used commercially take too much time to go into solution. Because low PAM concentrations of stock solution are the rule, large amounts of stock solution are needed for each application. Dissolving standard-sized polymers requires considerable experience. Training is often required to become proficient in getting water-soluble PAM particles into solution. When directions are not followed, failed applications result. If the PAM is not completely dissolved, particles of PAM tend to clump together in agglomerations. These large undissolved clumps make using solutions of PAM in sprinkler irrigation systems very difficult, as the clumps tend to clog the sprinkler lines and nozzles.

One approach to the time and concentration problems has been to use mechanical devices that meter the water-soluble PAM into a stream of irrigation water. A residence time in a tank of one hour or more before applying the solution to fields is realistic and common. For example, U.S. Pat. No. 5,450,985, to Meuleman, discloses a device that delivers dry water-soluble PAM into a canister and from there into an irrigation water stream, such as an irrigation ditch or canal, after a time period. This system does not produce PAM solutions for injection into sprinkler irrigation systems. U.S. Pat. No. 5,580,168, to Alireza, et al., discloses a venturi system for injecting water-soluble PAM first into a dispersion tank and then into an aging tank, which is further agitated before injecting the stock solution into an irrigation system. Solution time for both systems is much too slow for convenience. The size of the granules of water-soluble PAM that are used commercially is too large to allow faster solution times.

U.S. Pat. No. 5,548,020, to Santini et al., discloses an alternative procedure for putting water-soluble PAM into irrigation lines. A 30 percent concentrated emulsion product is prepared with kerosene or oil. The flow rate of this product is relatively slow, which decreases its usefulness for sprinkler irrigation systems. Also, this form of PAM flows into water like a semi-stiff string that requires considerable mechanical turbulence by a machine to put into solution. The kerosene or oil adds expense and appears to decrease the effectiveness of the soil conditioning properties of the PAM, and they are environmentally undesirable. The water-soluble PAM in the concentrated 30 percent solution-emulsion is considerably more expensive than granular or powder forms of water-soluble PAM to further detract from any advantage it may have.

Water-soluble polymers also have uses in drilling for oil, and oil drillers have developed various methods for putting the polymers into solutions. The polymer solutions produced for oil drilling have a high viscosity, which is undesirable for irrigation. The oil drilling solutions are typically produced without any accurate measuring of the amounts of the ingredients, which is not appropriate for agriculture. For these reasons the oil drilling industry methods are not applicable to the aqueous requirements for solution of water-soluble PAM for agricultural use.

The time needed for dissolution of water-soluble PAM can be decreased by using smaller particle size PAM, however there is no adequate bulk supply of suitable small particle PAM. Attempts have been made to grind PAM into smaller sizes, such as −100 mesh (<150 μm). However, PAM ground in this way loses many of its desirable properties. For example, the ground PAM is irregularly shaped, as shown in the electron micrograph in FIG. 1B. When observed with an optical microscope, the particles are entirely opaque. Most surfaces do not appear to have clean, flat faces, as with the larger size commercial grade particles. The particles tend to form clumps in water, which are difficult to dissolve. Many particles remain undissolved in water even after an hour or more. The solution formed from the dissolving particles is less viscous than a solution produced with a like concentration of PAM which was not first ground. This suggests that many of the large polymeric molecules have been broken by the grinding process. The ground PAM also has poor flow characteristics, as would be desirable in a metering system. This is probably due to the irregular shape of the ground particles, and their tendency to form clumps. In addition, the process for grinding the larger water-soluble PAM granules typically includes freezing the granules, which adds to the cost and complexity of the procedure.

Small quantities of small particle size water-soluble PAM can be obtained by screening the generally large-granule PAM from commercial sources. This is a laborious process which does not yield sufficient quantities to be commercially cost effective. As shown in the micrograph in FIG. 1C, the screened fines are very similar in appearance to the larger size, commercial grade PAM. When observed with an optical microscope, the particles are translucent, which may be due to fractures included in the particles. About 40–60% of the particles appear to have areas which are transparent. When added to plain water, the particles do not disperse well. Some of the particles appear to clump together. Many particles remain undissolved and visible, even after ten minutes of stirring or agitation. The screened fines also have poor flow characteristics.

SUMMARY OF THE INVENTION

In one aspect, the invention provides a material comprising dry, flowable, water-soluble polyacrylamide particles that are characterized by particle sizes of about −100 mesh (<150 μm), and prefereably +270 mesh (>53 μm). The polyacrylamide particles are essentially all soluble in plain or distilled water within about 10 seconds or less, to concentrations of up to about 0.5% by weight. The polyacrylamide particles essentially consist of molecules having a molecular weight of at least about 15 million a.u. At least about 90% of the polyacrylamide particles are further characterized by being transparent.

The polyacrylamide particles may be combined with one or more members of the group consisting of a calcium salt, a fertilizer, and gypsum. The calcium salt can include a member of the group consisting of calcium nitrate, calcium thiosulfate, and calcium chloride. The fertilizer may include potassium salts, ammonium salts, and mixes thereof which may also include calcium salts. The gypsum is preferably characterized by particle sizes of about −200 mesh, and more preferably about −325 mesh or smaller (<30 μm).

The material may be produced according to a process that includes the following steps: providing dry granules of water soluble polyacrylamide characterized by a particle size in a range of about +60, −25 mesh, and consisting essentially of molecules having a molecular weight of at least about 15 million a.u.; subjecting the granules to rapid pressure increases and decreases; and breaking up the granules into smaller particles with the pressure increases and decreases.

The invention also provides a method of reducing the mean particle size of dry granules of water-soluble polyacrylamide (PAM) that consist essentially of molecules having a molecular weight of at least about 15 million a.u. The method includes subjecting the granules to rapid pressure increases and decreases, and breaking up the granules into smaller particles with the pressure increases and decreases. The smaller particles are characterized by being flowable, and essentially consist of molecules having a molecular weight of at least about 15 million a.u. The smaller particles are preferably characterized by a particle size of about −100 mesh.

In one embodiment, subjecting the granules to the rapid pressure increases includes providing a particular type of mill to subject the particles to the rapid pressure changes. The mill includes a housing characterized by a first end having an input adapted to feed the granules into the housing, a second end having an output adapted to remove the smaller particles, and longitudinally extending internal sides that form longitudinally extending interior corners where they meet. A rotor assembly within the housing is characterized by a rotatable shaft extending longitudinally through the housing between the first and second ends, and a plurality of rotors coupled to the shaft for rotation therewith. Rotors of the plurality of rotors each include a rotor plate having a polygonal-shaped peripheral edge forming a plurality of apices, and vanes on a side of the rotor plate which each extend approximately radially from an apex. There is an orifice plate positioned between adjacently located pairs of the plurality of rotors. Each orifice plate extends inwardly from the internal sides of the housing to a central aperture which provides an orifice around the shaft. The method includes feeding the granules of water-soluble PAM into the housing while rotating the rotors at a speed sufficient to cause the granules to flow in an alternating outward and inward flow around peripheral edges of the rotor plates and through the orifices, for example, at a rotation rate of at least about 3000 RPM. Pressure on the granules increases and then decreases each time one of the vanes pass closely by a side of the housing. Pressure on the granules also increases as the granules flow towards each orifice and decreases as the granules pass out of each orifice. Preferably, the mill further includes circumferentially spaced members located proximate each of the rotors and extending inwardly from the corners of the housing toward the rotors. Pressure on the granules rapidly increases and then decreases each time one of the vanes pass closely by one of the members. The granules flow through the housing in a Coanda flow, substantially without high angle impacts on the rotor assembly, the orifice plates or the interior sides of the housing.

The invention further provides a method of producing an aqueous solution of water-soluble polyacrylamide (PAM) with a concentration of at least about 5 grams per liter and up to about 15 grams per liter or even more. This method includes providing a monovalent or divalent cation salt solution, and preferably a calcium salt solution, and adding particles of the PAM, which are characterized by a particle size of about −100 mesh and preferably +270 mesh, to the calcium salt solution such that the particles are essentially all dissolved within about 10 seconds.

This method can include one or more of the following features: The ratio of calcium:PAM is between about 0.5 and 2. The calcium salt includes a member of the group consisting of calcium nitrate, calcium thiosulfate, calcium sulfate, and calcium chloride. Adding the PAM particles includes stirring or agitating the solution while adding the PAM particles. The salt solution can further include a fertilizer.

According to yet another aspect of the invention, an aqueous stock solution for soil treatment includes water-soluble polyacrylamide (PAM) with a concentration of at least about 5 grams per liter and a calcium salt. The solution has a calcium to PAM ratio that is at least about 0.5. The calcium:PAM ratio is preferably about 1.0 to about 32. The calcium salt preferably includes a member of the group consisting of calcium nitrate, calcium thiosulfate, calcium sulfate, and calcium chloride.

In still another aspect, the invention provides a method of soil conditioning that includes providing an aqueous stock solution comprised of water-soluble polyacrylamide (PAM) with a concentration of at least about 5 grams per liter and calcium with a calcium:PAM ratio of at least about 0.5, mixing the stock solution with additional water to make a diluted solution, and applying the diluted solution to an area of soil. Applying the diluted solution can include spraying the diluted solution through one or more nozzles of an irrigation system. The ratio of calcium to PAM (Ca:PAM) in the stock solution is preferably between about 0.5 and 32. The diluted solution can further include at least one of a fertilizer and gypsum.

The invention also provides a method of soil conditioning. The method includes the steps of providing a conditioning material that includes dry, flowable, water-soluble polyacrylamide (PAM) particles that are characterized by particle sizes of about −100 mesh and preferably +270 mesh, wherein the PAM particles are essentially all soluble in water within about 10 seconds or less, and applying the conditioning material to an area of soil. The conditioning material can further include a calcium salt, gypsum particles, a fertilizer, or another soil conditioner. Applying the conditioning material can include mixing the conditioning material with the soil such that each pound of the soil mixed with the conditioning material includes at least about 8,000 of the PAM particles.

Advantages of the invention include the following:

High quality, small particle size, water-soluble PAM can be produced in large quantities without grinding or freezing. The particles produced by this method flow very well, do not tend to clump together, and easily and quickly go into solution, even in plain tap or distilled water. The small particles retain all the soil conditioning properties of the larger size, commercial grade PAM particles. Because of their small size, they can be dispersed in the soil more thoroughly than the larger size particles. Particles can be made in discrete size ranges that can be blended with gypsum or other soil conditioners of similar particle size. These particles have a lower water content than ground particles, which makes it more efficient on a per pound basis, and therefore lower cost, for shipping and handling.

Water-soluble PAM is easily and near instantaneously put into solution. Conventional procedures using the larger size PAM granules do not do this, even with the use of fertilizer salts. Relatively high concentrations of water-soluble PAM in stock solutions are obtained when mixing small particle size PAM with divalent or monovalent cation salt solutions to exceed the levels possible with conventional procedures. The process of making solutions of water-soluble PAM is much simplified compared with conventional procedures. Failures are avoided.

When used with calcium solutions, the effectiveness for soil improvement of a given amount of water-soluble PAM is at least twice that obtained with conventional methods for solution preparation of water-soluble PAM.

Erosion control with water-soluble PAM for furrow irrigation is made more simple and more effective than conventional procedures. Lower concentrations of PAM in solution are needed for furrow irrigation.

BRIEF DESCRIPTION OF THE DRAWING

The invention may be apprehended with reference to the following detailed description and the drawings, in which.

DETAILED DESCRIPTION OF THE INVENTION

Figure 1A:
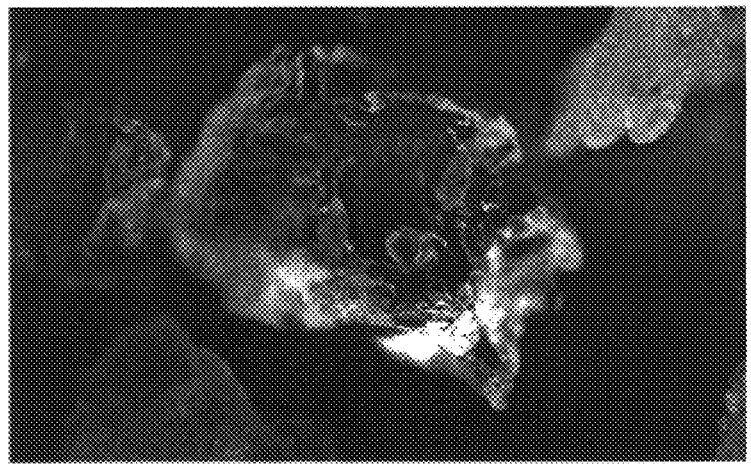
FIGS. 1A, 1B, and 1C are 80X photomicrographs taken with Nomurski optics of prior art water-soluble PAM particles. The PAM in FIG. 1A is large granule feed stock material from a commercial source; the PAM in FIG. 1B has been reduced in size by ball grinding; and the PAM in FIG. 1C is a screening from the commercial source.

The invention provides a flowable form of water-soluble PAM that is characterized by particle sizes of about −100 mesh (<150 μm), and preferably about +270 to −150 mesh (53–106 μm). When the small PAM particles are observed under a microscope, transparent regions are visible in about 90% or more of the particles. These particles appear to be substantially clear of defects, such as the fractures seen in the screened fines, and have flat crystaline faces.

Water-soluble PAM in this size range can be produced in bulk quantities at low cost by using a resonance disintegration (RD) mill, as described below, to subject larger size, commercially available granules of PAM to rapidly alternating increasing and decreasing pressures. It is believed that the rapid pressure changes within the RD mill split, cleave or otherwise break up the granules without significantly roughening their surfaces or changing the character of the polymerized crystals. The RD mill may also be used to produce small particle size gypsum to sizes of about −325 mesh, or to produce other small particulate materials that can be mixed with the PAM for soil conditioning.

In a preferred embodiment, the larger size granules are made of molecules with a molecular weight in a range of about 15–22 million atomic units (a.u.). It appears that the milled, small particle size product is also made of molecules with a molecular weight that is substantially unchanged from the starting material. Smaller or larger molecular weight molecules of PAM may also be used as a starting material for making the small particle PAM.

The small particle PAM can be spread directly on soils or mixed into soils as a dry powder, or can be used to make a solution for spreading with a standard type of sprinkler or drip irrigation system. When added to plain tap water, or even distilled water, the small particles of PAM produced by the RD mill will essentially all dissolve within about 10 seconds or less, producing a clear solution. As used herein, "essentially all dissolved" means that the resulting near-instantaneous solution is fully usable and has no visible undissolved particles or clumps, even when observed as a thin film.

By mixing the small particle PAM in a solution containing divalent or monovalent cation salts, and particularly calcium salts, small particle size PAM goes into solution almost instantaneously and more concentrated PAM solutions than with water alone can be obtained. Near instantaneous (e.g., in a few seconds), high concentration PAM solutions can also be obtained with small PAM particles produced by grinding or screening the larger size commercial grade particles.

In the following sections, an RD mill will be described first. Methods of using the RD mill to make the small particle size PAM will be described next, followed by a description of methods of making solutions of PAM, and a description of uses of the PAM preparations for soil conditioning.

RD Mill

An RD mill is described in copending U.S. patent application Ser. No. 09/290,484, filed Apr. 12, 1999, U.S. Pat. No. 6,227,473 to Charles A. Arnold, the entire disclosure of which is included herein by reference. A material fed into an RD mill is entrained in a flow which is subjected to rapid pressure increases and decreases, which may include shock waves. It is believed that the material is broken up into smaller particles when the pressure changes in the material cause the natural elasticity of the material to be exceeded. This effect can be enhanced by operating the RD mill to generate pressure pulses at natural resonant frequencies of the material. Material will tend to split apart where bonds are weakest. A polymeric crystaline material, such as PAM, will therefore tend to break apart at intermolecular bonds which hold aggregates of molecules together, because these bonds are weaker than the co-valent bonds within each molecule.

Figure 2:
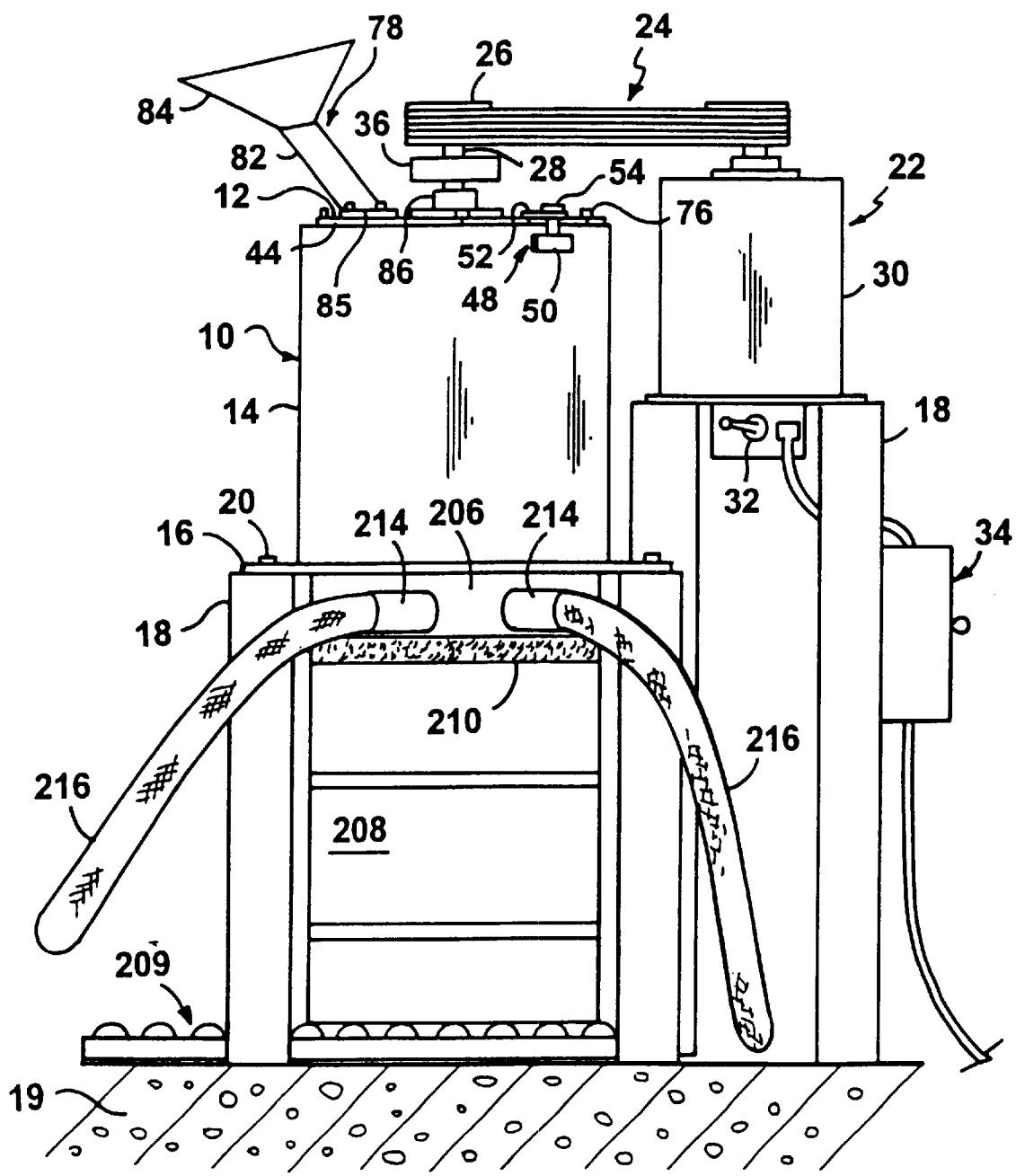
FIG. 2 is an elevation view of a milling system according to the invention.
Figure 3:
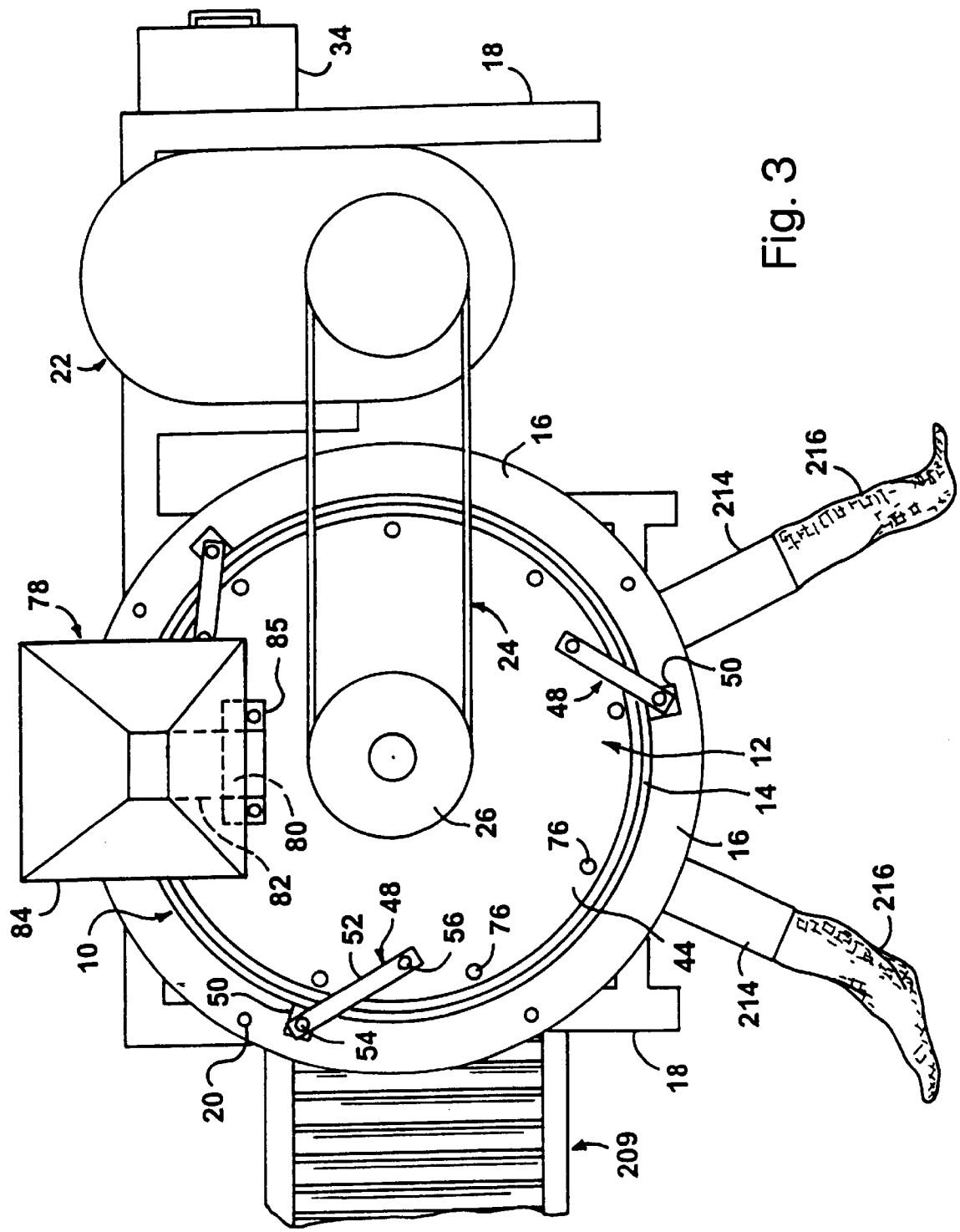
FIG. 3 is a top plan view of the milling system illustrated in FIG. 2.

Referring to FIGS. 2 and 3, an RD mill 10 includes a housing 12 containing a rotor assembly 38, which will be described in detail below. Housing 12 is surrounded by a cylindrical shield 14 that is supported from an annular plate 16 by a free-standing support frame 18 on a concrete slab 19. Annular plate 16 is welded to shield 14 and secured to frame 18 with bolts 20.

Frame 18 also supports a motor assembly 22, which provides rotational power to the rotor assembly via a single four-grooved belt 24 coupling to a variable mechanical sheave 26. Sheave 26 is connected to a rotor shaft 28 that extends through housing 12. Rotor shaft 28 is fabricated from 2 inch diameter, 4140 steel rod. Motor assembly 22 includes a 25 hp, 230 V, three phase motor 30 that has a variable speed control 32. Motor assembly 22 receives power from a fusible disconnect 34. The variable mechanical sheave and control 32 permit the speed of rotor shaft 28 to be continuously varied between about 600–3800 revolutions per minute (rpm). A sprocket assembly 36 attached to shaft 28 is used to measure the actual rotational speed of shaft 28. A shroud (not shown) can be used to cover belt assembly 24.

Figure 4:
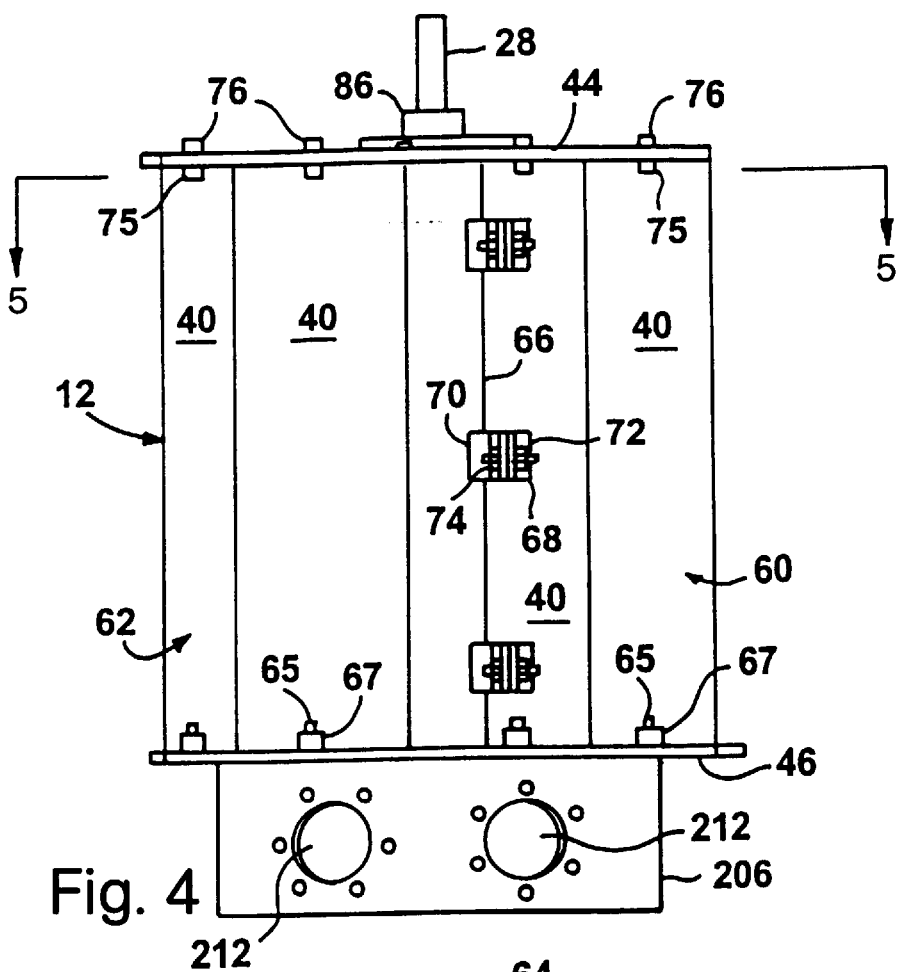
FIG. 4 is an elevation view of a rotor assembly housing of the milling system illustrated in FIG. 2.
Figure 5:
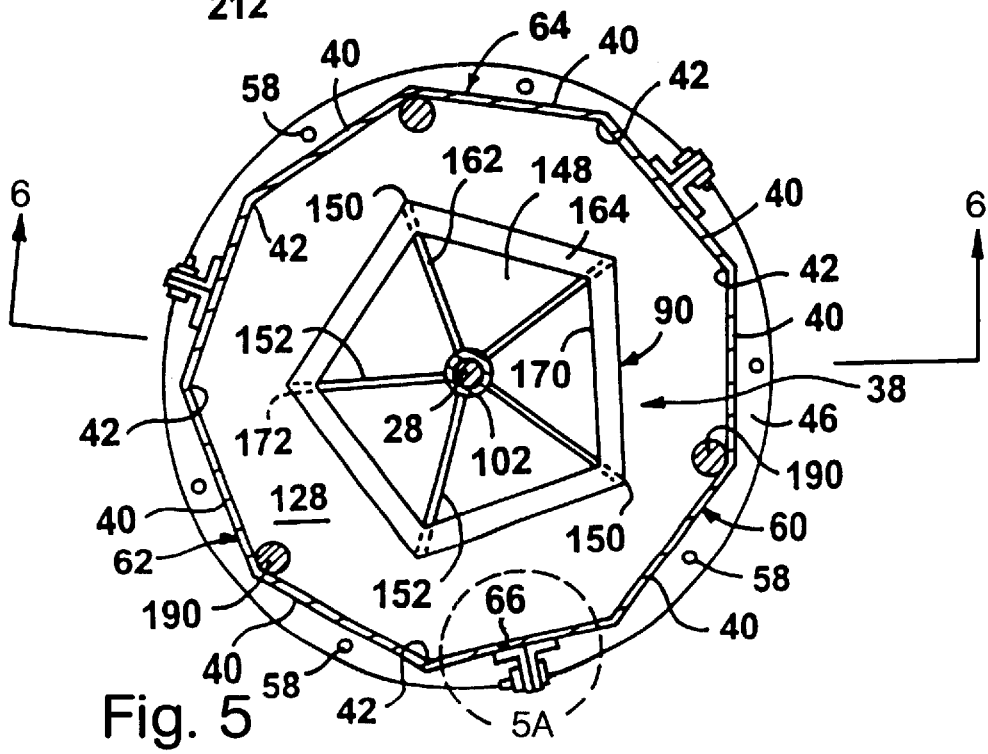
FIG. 5 is a cross sectional view through line 5—5 of FIG. 4, and in which a distributor rotor is shown in plan view.

Referring now also to FIGS. 4 and 5, housing 12 has nine longitudinally extending side walls 40 forming a regular polygon shape in latitudinal cross section. The interior surface of housing 12 has an inscribed diameter of approximately 23.5 inches. Sides 40 form 40° apices, or interior corners 42, where they meet. Sides 40 and interior corners 42 extend longitudinally between a top plate 44 and a bottom plate 46. Top and bottom plates 44, 46 are approximately 30.5 inches apart. Top plate 44 is rigidly tied to shield 14 with three strap assemblies 48 (FIGS. 2 and 3). Strap assemblies 48 each include a bracket 50 welded to the outer surface of shield 14, a rigid strap 52, and bolts 54, 56 connecting strap 52 to bracket 50 and top plate 44, respectively.

Figure 5A:
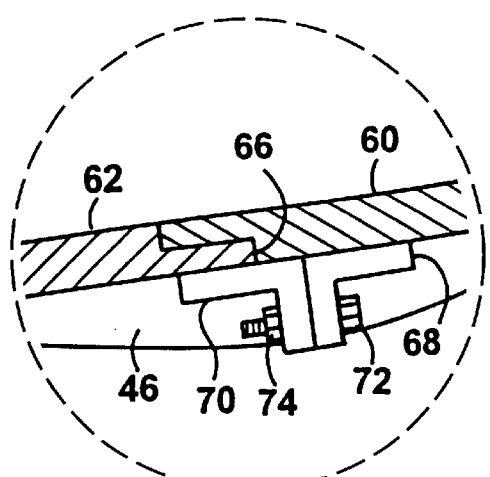
FIG. 5A is a detail of FIG. 5.

Sides 40 are formed of three panels 60, 62, 64, each including two full sides 40 and two partial sides 40, and three interior corners 42. Referring now also to FIG. 5A, each pair of panels, e.g., 60 and 62, is joined with an overlapping seam 66 located about midway between corners 42. Brackets 68 are welded to panel 60, and brackets 70 are welded to panel 62 adjacent to seam 66. Bracket pairs 68, 70 are tied together with bolts 72 and nuts 74. A silicon based sealant is used at seam 66 and other joints between pieces of housing 12 to make housing approximately air-tight.

Referring again to FIGS. 3 and 4, bottom plate 46 is supported from a portion of annular plate 16 that extends radially inward a short distance from shield 14. A gasket (not shown) providing a seal is placed between annular plate 16 and bottom plate 46. A J-bolt arrangement (not shown) is employed for ensuring a positive seal with the gasket. Bottom plate 46 is secured to panels 60, 62, 64 with nine threaded fasteners 65 that extend through apertures formed in respective fittings 67 attached to panels 60, 62, 64, and that screw into threaded holes 58 arrayed around the periphery of bottom plate 46. Top plate 44 is bolted ton threaded fittings 75 on panels 60, 62, 64 with threaded fasteners 76.

A feed chute 78 for introducing material to be pulverized into housing 12 extends through an aperture 80 in top plate 44. For clarity of illustration, feed chute 78 is illustrated at a position in FIG. 3 that is different from the position depicted in FIG. 2. Feed chute 78 includes a rectangular shaped tube 82 that is oriented relative to the plane of top plate 44 at an angle of approximately 44 degrees. Feed chute 78 also has a funnel 84 at its top end and a bracket 86 for attachment to top plate 44. Tube 82 is approximately 13.25 inches long, extends approximately 1.375 inches below the bottom side of top plate 44, and has interior dimensions of 3×4 inches. Tube 82 includes a flange 85 for attaching feed chute 78 to top plate 44, e.g., with threaded fasteners.

The rotor assembly 38 will now be described in detail with reference to FIGS. 2 and 5–7. Rotor assembly 38 includes a rotatable shaft 28 that extends longitudinally through housing 12. Shaft 28 extends through a top bearing assembly 86 that is bolted to top plate 44. Sprocket speed indicator assembly 36 and sheave 26 are positioned on shaft 28 above top bearing assembly 86. A bottom bearing assembly 88 is bolted to the bottom side of bottom plate 46. Shaft does not extend through bottom bearing assembly 88.

Within housing 12, there are six longitudinally spaced rotors 90, 92, 94, 96, 98, 100, each being fixed to a respective hub 102, 104, 106, 108, 110, 112 that is coupled to shaft 28 by two keys (not shown). Spacers 114, 116, 118, 120, 122, which are also keyed onto shaft 28, are positioned between adjacent pairs of hubs 102, 104, 106, 108, 110, 112. Spacers 124 and 126 are positioned adjacent top plate 44 and bottom plate 46, respectively. Spacer 124 is also secured to shaft 28 with a set screw (not shown). Shaft 28 can be fabricated is made of 2 inch diameter 4140 alloy steel. The diameter of each spacer is approximately 3.5 inches. The longitudinal position of one or more than one of rotors 90, 92, 94, 96, 98, 100 can be adjusted by changing the length one or more of spacers 114, 116, 118, 120, 122, 126.

Orifice plates 128, 130, 132, 134 and 136 are positioned between adjacent pairs of rotors 90, 92, 94, 96, 98 and 100. Each of orifice plates 128, 130, 132, 134, 136 includes a central aperture, which, with its respective spacer 114, 116, 118, 120, 122, provides an annular shaped orifice 138, 140, 142, 144, 146 therebetween. Orifice plates 128, 130, 132, 134, 136 each extend to housing sides 40 such that there is no gap between the edge of an orifice plate and the housing sides 40. A gasket or other sealing means can be used to assure that there is no space between orifice plates 128, 130, 132, 134, 136 and housing sides 40 through which air can flow.

In the described embodiment, each of shield 14, annular plate 16, top plate 44, bottom plate 46, panels 60, 62, 64, rotors 90, 92, 94, 96, 98, 100, and orifice plates 128, 130, 132, 134, 136 are fabricated of 0.5 inch thick low-carbon steel, such as, for example, 1020 steel.

Figure 8:
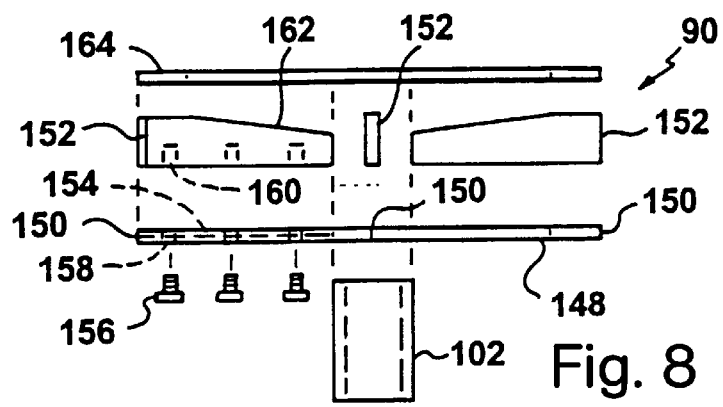
FIG. 8 is an expanded view of the distributor rotor.

Referring now also to FIG. 8, the topmost rotor 90, which will also be referred to as a distributor rotor, is positioned closest to where material is fed into housing 12 via feed chute 78. Distributor rotor 90 includes a distributor rotor plate 148 having a regular pentagonal-shaped peripheral edge forming five apices, or outside corners 150. Five distributor rotor vanes 152 extend upwards toward top plate 44 from the top side of distributor rotor plate 148 (only three vanes are shown in FIG. 8 for clarity). Each distributor rotor vane 152 also extends approximately radially inward from an outside corner 150 to hub 102. Vanes 152 can be fixed to distributor rotor plate 148 and hub 102 by welding. Alternatively, each distributor rotor vane 152 can fit into a corresponding slot 154 formed in distributor rotor plate 90, and secured by threaded fasteners 156 that extend through apertures 158 in distributor rotor plate 90 and screw into corresponding threaded holes 160 in distributor rotor vane 152. An upper edge 162 of each distributor rotor vane 152 is sloped upwards from an elevation of about 1 inch at 102 to an elevation of about 1.5 inches near the periphery of plate 148. A pentagon-shaped distributor ring 164, which is about 1.5 inches wide, is welded to the upper edges 162 of distributor rotor vanes 152.

Each of distributor rotor plate 148, distributor ring 164, and distributor rotor vanes 152 are fabricated from 0.5 inch low-carbon steel plate. Distributor rotor is circumscribed by a 17 inch diameter circle and is approximately 2.7 inches high. Distributor ring 164 is located approximately 1.625 inches below top plate 44 and approximately 0.25 inches below a discharge opening 166 of feed chute 78. Discharge opening 166 of feed chute 78 is positioned such that when a center of a chord of distributor ring 164 is aligned with discharge opening 166, a radially innermost edge 168 of discharge opening 166 extends about 0.5 inches inwardly beyond an inner edge 170 of distributor ring 164. When a corner 150 of distributor rotor 90 is aligned with feed chute 78, the outside of discharge opening 166 is completely inside distributor ring 164. This provides a large area to feed material into slots between distributor rotor vanes 152, and discharges the material from feed chute 78 onto rotor 90 as radially distant from hub 102 as possible. For reasons that will be discussed below, each vane 152 is positioned such that when rotor assembly is spinning, a trailing outer edge 172 of each distributor rotor vane 152 is shaped to be about aligned with the peripheral edge of distributor rotor plate 148 at a trailing edge of an apex 150, either without any overlap or with distributor rotor vanes 152 extending slightly over the edge of distributor rotor plate 148.

Other rotors 92, 94, 96, 98, 100 are designed differently from distributor rotor 90, but similarly to each other. Rotor 94 will be described as an example, with reference to FIG. 9. Rotor 94 includes an rotor plate 174 having a regular nine-sided polygonal peripheral edge 176 forming nine apical corners 178. Rotor plate 174 is welded or otherwise rigidly coupled to hub 106. Rotor 94 also includes nine curved vanes 180, each extending approximately radially inward toward hub 106 from a respective one of the apical corners 178. Vanes 180 are approximately six inches long and extend approximately one inch above rotor plate 174, which is about 0.5 inches thick. For most uses of RD mill 10, the interior curve of each of vanes 180 faces into the direction in which rotor assembly turns. Rotor plate 174 is fabricated from 0.5 inch low-carbon steel plate, and vanes 180 are fabricated from 0.5 inch wall, 8 inch outer diameter steel tubing. Vanes 180 are set in respective 0.125 inch deep grooves (not shown) formed on an upper face of rotor plate 174, and secured in place with three threaded fasteners (not shown) that extend through apertures (not shown) formed in rotor plate 174, in a manner similar to that described above with reference to distributor rotor 90 illustrated in FIG. 8. This arrangement permits simple removal and replacement of vanes 180. Outer trailing edges 182 of vanes 180 are beveled at an angle to align with peripheral edge 176 of rotor plate 174 and such that trailing edge 182 extends slightly over edge 176 of rotor plate 174 on the trailing side of an apical corner 178.

The other rotors, rotors 92, 96, 98 and 100, are configured similarly to rotor 94, each having a nine-sided peripheral edge 176 and curved vanes 180 extend radially inward from apical corners 178 toward respective hubs 104, 108, 110 and 112. In the embodiment illustrated in FIG. 6, rotors 92, 94, 96, 98 and 100 are circumscribed by circles having diameters of 17, 19, 21, 21, and 21 inches, respectively. Each of vanes 180 is approximately 6 inches long about its outer perimeter and shaped at its apical corner 182 so that there is a slight overlap between vane 180 and rotor plate 174 at its trailing edge 182. Each of rotors has a height of approximately 1.5 inches. Because rotor 92 is smaller than the other rotors and vanes 180 are the same size on all rotors 92, 94, 96, 96, 100, each of vanes 180 on rotor 92 extend approximately to hub 104, whereas vanes 180 on rotors 94, 96, 98, 100 do not extend all the way to hubs 106, 108, 110, 112, respectively, a gap being provided therebetween.

Figure 12:
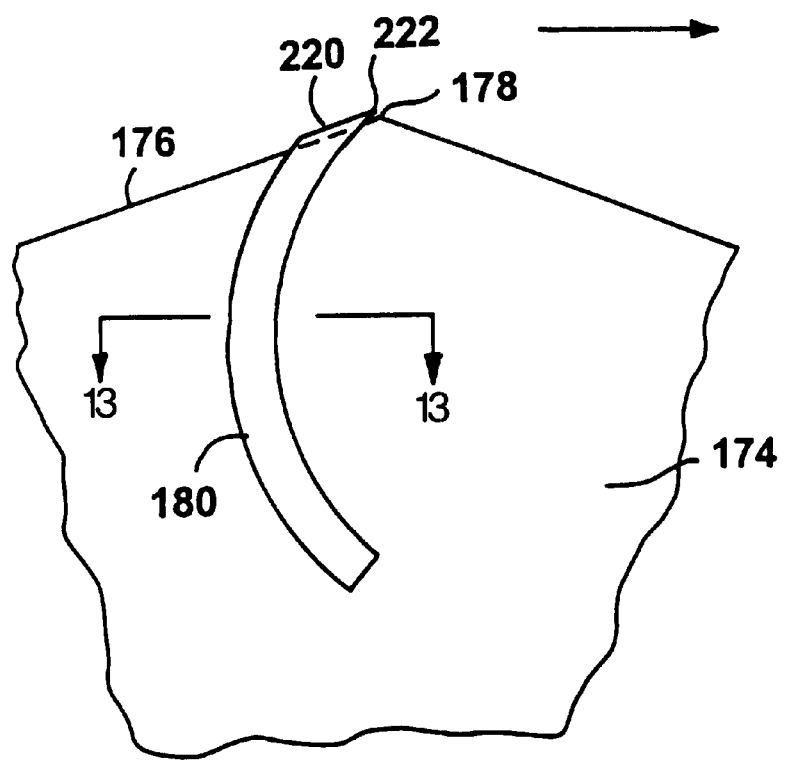
FIG. 12 is a plan view of a portion of a rotor with another embodiment of a rotor vane.

Referring now to FIG. 12, each of vanes 180 may be positioned to provide a small overhang 220 over the edge 176 of the rotor plate to which it is attached. Overhang 220 would be no more than about a thirty-second of an inch, and would enhance the flow through RD mill 10. Note that vane 180 illustrated in FIG. 12 is also positioned such that overhang 220 is shaped similar to edge 176 of rotor plate 174, and an outer tip 222 of its leading surface 224 is positioned about over apical corner 178. The arrow in the figure indicates a direction of rotation.

Figure 13:
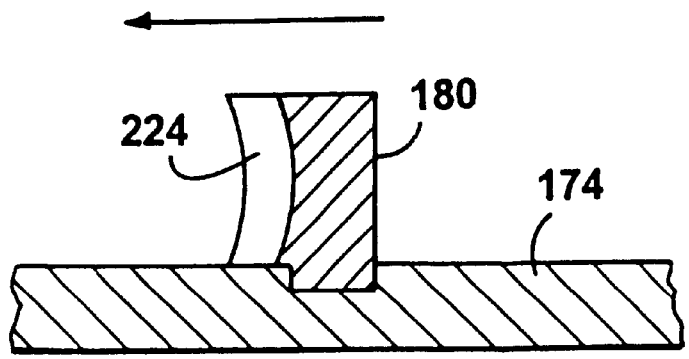
FIG. 13 is a cross sectional view through line 13—13 of FIG. 12.

Referring now to FIG. 13, vanes 180 may also be modified to have a curved profile, like a turbine blade, on its leading surface 224 with respect to a direction of rotation (arrow) to provide a more efficient pumping action.

Figure 9:
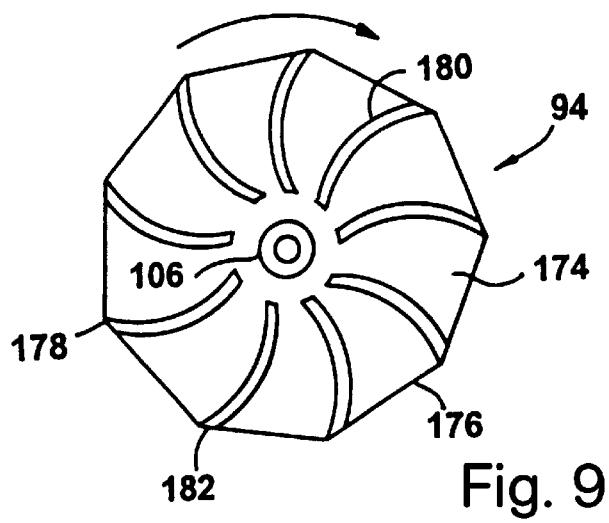
FIG. 9 is a top plan view of an orifice plate of the rotor assembly.

Referring now also to FIG. 9, orifice plate 128 can be fabricated from 0.5 inch low-carbon steel plate. Its peripheral edge 184 forms a nine-sided polygon sized to fit closely against sides 40 of housing 12. Orifice plate 128 includes a central aperture 186 formed by inner rim 188, which, with spacer 114, provides annular-shaped orifice 138 therebetween. Orifice plates 130, 132, 134, and 136 are similarly configured. Orifice plates 128, 130, 132, 134, and 136 have apertures 186 with diameters of 7, 8, 9, 10 and 11 inches, respectively.

Figure 11A:
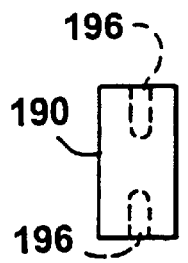
FIGS. 11A and 11B are elevation and plan views, respectively, of a rotor assembly support pin.
Figure 11B:
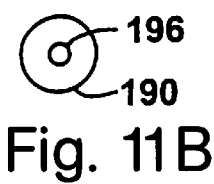
Figure 7:
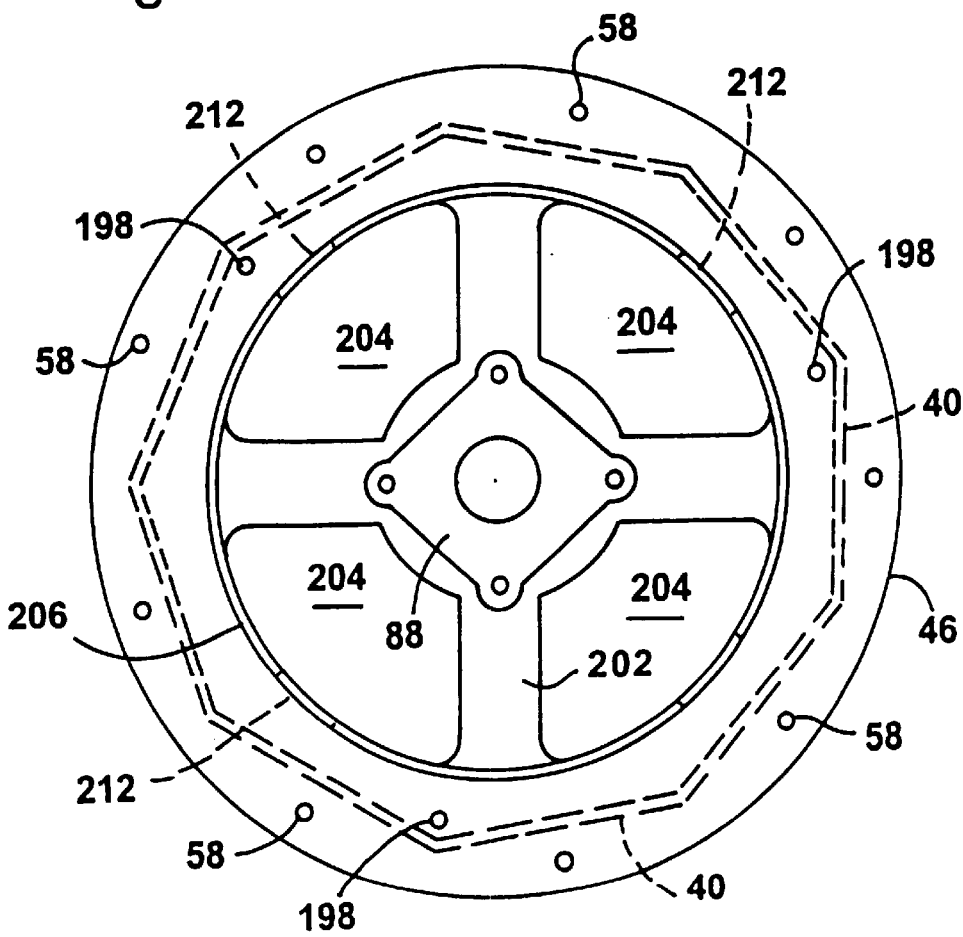
FIG. 7 is a bottom plan view of the rotor assembly housing.
Figure 6:
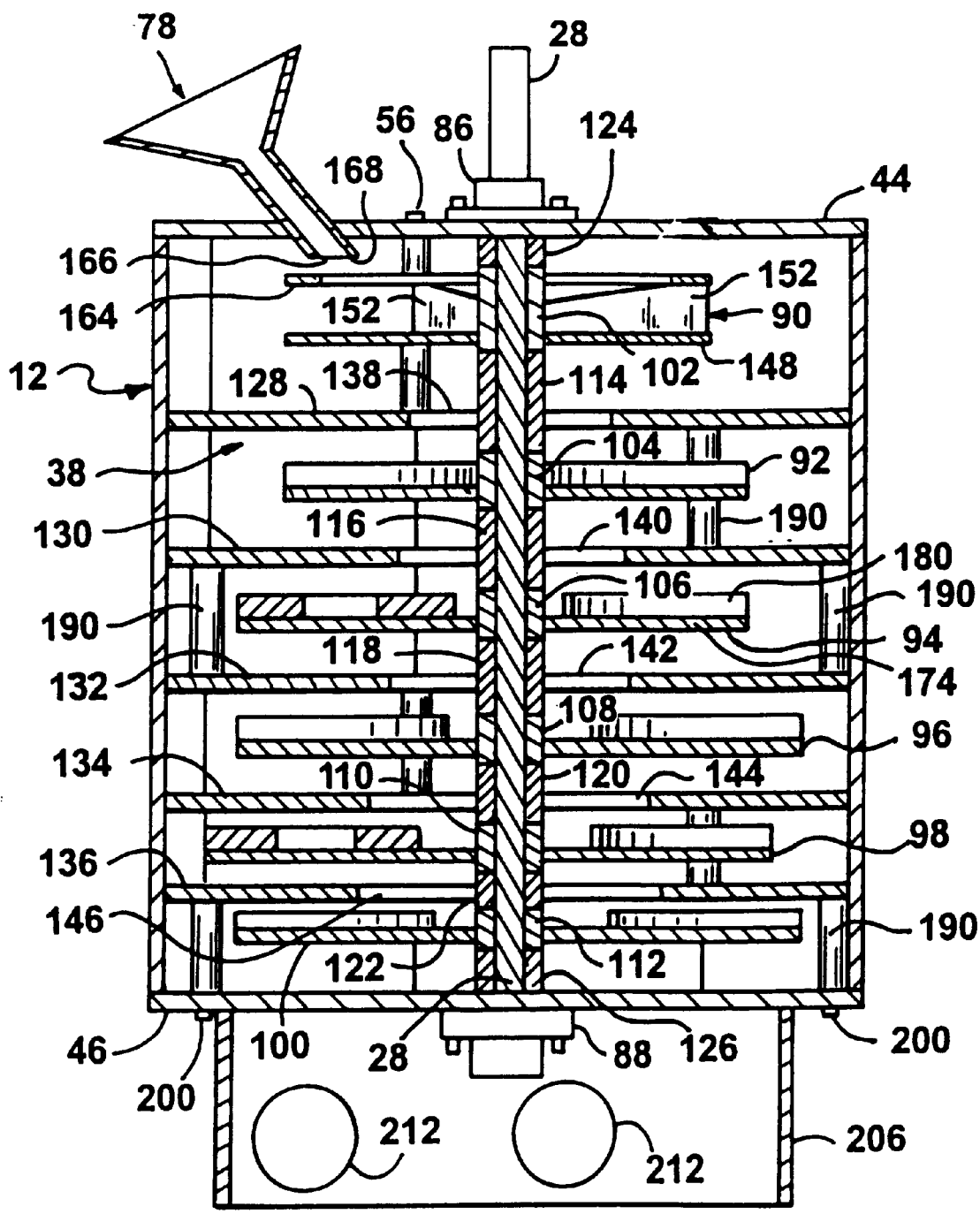
FIG. 6 is a cross sectional view through line 6—6 of FIG. 5, showing the rotor assembly within the rotor assembly housing, with a second feed chute included.
Figure 10:
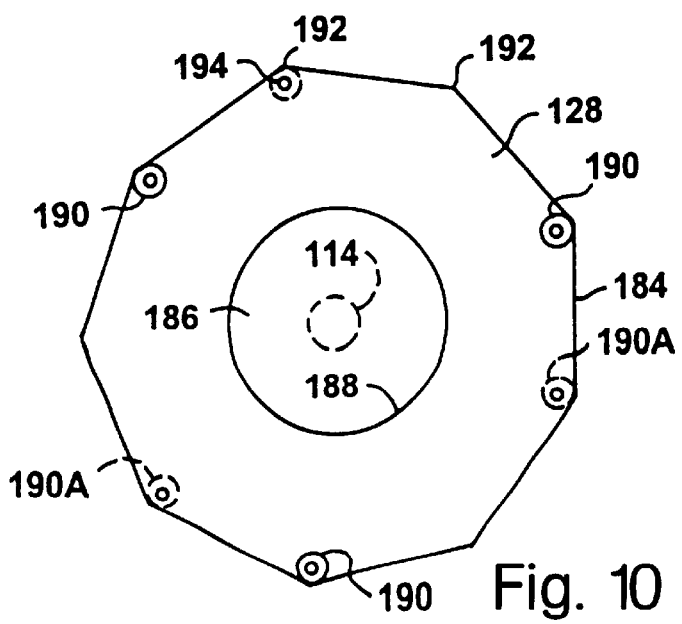
FIG. 10 is a top plan view of a rotor.

Referring back to FIGS. 5 and 6, and also to FIGS. 11A and 11B, orifice plates 128, 130, 132, 134, 136 are supported independently of panels 60, 62, 64 by support pins 190. Support pins 190 can be fabricated from 2 inch diameter steel rod. Three equally spaced apart pins 190 are positioned between each neighboring pair of the orifice plates. Each support pin 190 is located at an apical corner 192 of an orifice plate so that it is adjacent an interior corner 42 of housing 12. As shown in FIGS. 6 and 10, support pins 190 on one side of an orifice plate, e.g. orifice plate 128, are offset by one apex (40°) from support pins 190A on the other side of that orifice plate.

Support pins 190 are attached to the orifice plates by threaded fasteners 194, e.g., bolts, that extend into countersunk through holes (not shown) formed in the orifice plates and into threaded holes 196 formed in pins 190. Three support pins 190 that are attached to an upper side of orifice plate 128 can also be attached to top plate 44 with bolts 56, which are also employed to hold straps 52 as described above with reference to FIG. 3. Three support pins 190 that are attached to a bottom side of orifice plate 136 can also be attached to bottom plate 46. Bottom plate 46 includes three apertures 198 through which threaded fasteners 200 (shown in FIG. 6) can be inserted for fastening to these three pins 190.

Referring again to FIG. 7, bottom plate 46 includes a web 202 forming four apertures 204 through which pulverized material is discharged from housing 12. A 23 inch diameter skirt 206 depends from bottom plate 46 just outside of apertures 204. Web 202 supports rotor assembly 38 from bottom bearing assembly 88, which is bolted to web 202. The size of web 202 is made as small as possible to maximize the size of apertures 204 within skirt 206.

The diameter of skirt 206 is sized to fit into a 55 gallon open barrel 208, which rests on rollers 209. A fabric belt 210 is employed between skirt 206 and barrel 208 to inhibit fine pulverized particles from escaping. Skirt 206 includes four apertures 212 (only two shown in FIG. 4). Each aperture 212 includes a bolt circle employed for attaching a respective 6 inch diameter tube 214 (only two shown in FIGS. 2 and 3). Tubes 214 extend approximately radially outward from skirt 206, and each tube 214 has a fabric filter bag 216 removably attached to it. Air is exhausted from RD mill 10 through tubes 214. Filter bags 216 and catch fine particles and allow air to pass through.

In the described embodiment, rotors 90, 92, 94, 96, 98, 100 and orifice plates 128, 130, 132, 134, 136 are positioned as follows: The top surfaces of orifice plates 128, 130, 132, 134, and 136 are respectively located approximately 2.875, 2.125, 1.875, 1.625, and 1.375 below the bottom surfaces of respective rotors 90, 92, 94, 96, and 98. Orifice plates 128 and 130 are approximately 5 inches apart; orifice plate 130 and 132 are approximately 4.5 inches apart; orifice plates 132 and 134 are approximately 4 inches apart; and orifice plates 134 and 136 are approximately 3.5 inches apart. The tops of vanes 180 on rotors 92, 94, 96, 98 and 100 are about 1.375, 1.187, 0.875, 0.625, and 0.5 inches below respective orifice plates 128, 130, 132, 134, and 136. Rotor 100 is positioned approximately 1.75 inches above bottom plate 46. Rotors 92, 94, 96, 98 and 100 are rotated relative to their next nearest rotor by about 7.2 degrees.

It can be seen that rotors 90, 92, 94, 96, 98, 100 of rotor assembly 38 have sizes that generally increase with increasing distance from a top end of housing 12 through which material to be pulverized or otherwise processed is introduced into housing. The smallest rotors 90, 92 are located closest to top plate 44, the largest rotors 96, 98, 100 are positioned closest to bottom plate 46, and an intermediate sized rotor 94 is positioned about midway between top plate 44 and bottom plate 46. This arrangement is particularly adapted for pulverizing large size objects. If the feed material comprises smaller sized particles, on average, the rotors could be of a more uniform, larger size. In some applications, it may be advantageous to have rotors that are all the same size, or to alternate between larger and smaller rotors in some fashion.

In addition, orifices 138, 140, 142, 144, 146 are of generally increasing size with increasing distance from the top end. This arrangement is used to maintain a negative back pressure at each stage. For other applications, this arrangement could be reversed, the orifices could be a more uniform size, or the orifice sizes could be varied in a different manner from one end of housing 12 to the other.

The spacing between each orifice plate and the rotor next below it generally decreases with increasing distance from top to bottom. Moreover, the rotors and orifice plates are positioned such that the spacing between adjacent orifice plates generally decreases from top to bottom. This decreases the volume in stages between the top and bottom of rotor assembly 38.

Material flowing through an orifice in RD mill 10 first undergoes a velocity increase and an accompanying decrease in pressure. Then, because the available volume decreases at each succeeding stage, the material flowing through RD mill 10 experiences a rapid compression, which in turn can cause a rapid increase in pressure and/or temperature. The size of the orifice is increased with each succeeding stage to provide a pressure immediately downstream of an orifice that is lower than the pressure immediately upstream the orifice. This negative back pressure that is maintained across each orifice helps to maintain the flow.

As best understood at this time, material introduced into RD mill 10 with rotor assembly 38 spinning at speeds of approximately 1000 revolutions per minute (rpm) or greater are pulverized primarily by pressure changes, which may include shock waves, which are generated within housing 12. Observations indicate that material fed into feed chute 78, as well as air entering through feed chute 78, is accelerated rapidly and is then entrained into a fluid-like flow through the spinning rotor assembly 38. It appears that the material in the flow is almost immediately subjected to a rapid-fire succession of shock waves, the first of which may begin to break up the feed-stock material even before it reaches the distributor rotor.

The spinning rotors 90, 92, 94, 96, 98, 100 create a very strong air flow through housing 12. It appears that material fed into RD mill 10 through feed chute 78 is entrained in this flow. The material apparently flows, with the air flow, through RD mill 10 making minimal contact with sides 40 of housing 12 or with orifice plates 128, 130, 132, 134, 136. This, it is believed, is due to the flow being influenced by the Coanda effect to closely follow the contours of the rotor peripheries 174 and orifice rims 188. For this reason, the flow of material and air through RD mill 10 is called a "Coanda flow." The Coanda effect helps to reduce high-angle contacts between the flowing material and the component parts of RD mill 10, and thereby reduce the likelihood that surfaces of a crystalline material, such as water-soluble PAM, will be pitted, broken, or otherwise changed in character by collisions with RD mill surfaces. Distributor ring 164 acts as a shroud to enhance the Coanda effect.

The Coanda flow rapidly changes direction as it rounds the peripheral edge of each rotor and the rim of each orifice, alternating between a flow that is directed radially outward and a flow that is directed radially inward. The sizes of the orifices increase with each succeeding stage to maintain a negative back pressure throughout rotor assembly 38, which helps to keep the velocity of air and particles sufficiently high to maintain the Coanda flow.

Observations made when pulverizing harder and larger materials, such as 1 inch (2.5 cm) ceramic balls, indicate that when vanes 152, 180 are not positioned on the trailing side of apical corners 150, 178, respectively, rotor plates 148, 174 experience wear, becoming slightly rounded on the underside adjacent and downstream from where vanes 152, 180 attach. This is evidence that the material is entrained in a Coanda flow that closely follows the contour of the periphery of each rotor. The leading side of each rotor vane 152, 180, particularly in the region close to its respective rotor plate 148, 174, also indicates increasing wear with proximity to its outer edge. There is also a tendency for material to ride up the side of the vane as the material is moved radially outward by the vane. However, the wear pattern shows little scoring or pitting, which would be expected if the material was not entrained in a Coanda flow. These are the only areas of rotors at which wear has been noticed. Sides 40 and orifice plates 128, 130, 132, 134, 136 show some evidence of some large particle impacts when pulverizing ceramic balls, but no wearing pattern as observed on the rotors. It is expected that a softer material, such as PAM granules, with a smaller particle size than the ceramic balls will experience even fewer collisions with parts of RD mill 10.

To enhance the Coanda effect on the material flowing past vanes 152 and 180 and around rotor plates 148, 174, outer edges of the vanes can be beveled and aligned with the peripheral edge of the respective rotor plate 150 and 174. The leading edge of each vane 152, 180 should go at least to the respective apex 150, 178 of the respective rotor plate 148, 174. Positioning vanes 152, 180 such that their outer edges are on the trailing side of apical corners 150, 178 should reduce the amount of wear.

Rapid pressure changes, such as shock waves, may be generated each time the flowing material experiences a rapid acceleration, such as when the direction of flow rapidly changes, or experiences a pressure change. Such pressure changes may generate large voltages due to piezoelectric properties of the materials, as they experience rapid compression or decompression. Some places where large accelerations may take place include at discharge opening 166 of feed chute 78, going around vanes 152, 180, going around distributor rotor plate 148 and around rotor plate peripheral edges 176, and going around rims 188 of orifices 138, 140, 142, 144, 146. Large pressure changes may take place when the flow passes through an orifice or when the flow is pumped by a rotor.

A non-uniform electromagnetic field may also be generated within housing 12 as rotor assembly 38 rotates. Rotors 90, 92, 94, 96, 98, 100, as well as housing 12 and orifice plates 128, 130, 132, 134, 136, are all made of low-carbon steel, which is ferromagnetic. The spinning rotors would create a rapidly changing, non-uniform electromagnetic field. These electromagnetic fields could enhance piezoelectric effects in the material in the Coanda flow.

Primary pulsed standing shock waves may also be produced as vanes 152, 180 on rotors 90, 92, 94, 96, 98, 100 alternately pass sides 40 and corners 42 of housing. Decompression would occur as the rotors pass each empty interior corner 42 of housing 12, and compression would occur as the vanes pass the center of each side 40. A shock wave of this type would be created every 40 degrees of rotation of each vane.

Moreover, secondary pulsed standing shock waves may be produced as vanes 152, 180 pass by support pins 190, three of which are located proximate each rotor. Vanes 180 of the largest rotors, rotors 96, 98, 100, pass within about 0.1 inches of support pins 190. These shock waves would be produced every 120 degrees of rotation of a vane on a rotor due to compression of the flow as the vane passes each of the three support pins located near the rotor. Twenty-seven of such shock waves are generated for each rotation of a nonagon-shaped rotor. Thus, support pins 190 are employed to support the orifice plates and also to help generate shock waves. While in the described embodiment cylindrical support pins are employed for these purposes, a different arrangement can be used to support the orifice plates, and differently shaped members can be positioned in corners 42 opposite respective rotor vanes 150, 180 for generating the secondary shock waves.

Before a material, such as PAM granules or gypsum, is fed into RD mill 10, rotor assembly 38 is brought up to an operating speed of rotation. The spinning rotors generate a large air flow with negative back pressure through feed tube 78 and down through RD mill 10. Thus, any material fed into feed tube 78 will be immediately drawn in and accelerated rapidly towards distributor rotor 90.

As noted above, material may be broken apart while accelerating down feed chute 78 and turning direction exiting discharge opening 166. It is believed that discharge opening 166 acts as an orifice through which air and the feed-stock material flows into the larger-volume region between top plate 44 and distributor rotor 90. The flow through this first orifice provided by discharge opening 166 can cause a pressure change, which may be accompanied by a temperature change. The pressure change, along with the rapid acceleration of the particles exiting feed tube 78, can cause a first shock compression and/or expansion and an initial breaking apart of some particles.

The PAM granules, gypsum, or other material that is smaller than about 1–1.5 inches in size, are quickly entrained in the Coanda flow and flow through distributor rotor 90 between distributor rotor plate 148 and distributor ring 164. When the Coanda flow passes through orifice 138, the particles experience a rapid directional change and an increase in velocity with a corresponding pressure rise. The flow is immediately compressed because the volume between orifice plate 128 and rotor 92 is smaller than the volume between rotor 90 and orifice plate 128. This can also cause a rapid increase in pressure and an accompanying temperature increase.

This process of rapid acceleration, expansion, and compression is repeated as the flow passes through each succeeding stage and rounds the rotors and orifices. These rapid variations in pressure and acceleration of the flowing material may contribute to creating shock waves which pulverize material flowing through RD mill 10. In addition, the rapid compressing and decompressing of material in the flow can cause a build-up of piezoelectric energy and subsequent releases in the material, which may cause the break-up of some material into smaller sized particles. It is believed that the primary and secondary pulsed shock wave fronts are reinforced by shock waves created by piezoelectric energy releases in the flow. The rapid flow of material through the non-uniform electric and magnetic fields within RD mill 10, which are generated by the spinning rotors, may also contribute to piezoelectric compression and decompression of material in the flow, thus also contributing to generating shock waves in the flowing material.

RD mill 10 heats a material being pulverized such that virtually all free moisture is driven off. Product comes out of RD mill 10 warmed to approximately 40–100 degrees Celsius or higher, depending on the material. Electric discharges from the material and the rapid expansion then compression after the flow passes through each orifice may increase the temperature of the flowing material and drive moisture out. The piezoelectric energy releases and frictional heating of particles in the flow likely contribute to the observed general increase in temperature of the pulverized material. However, flowing only air through RD mill 10 also causes housing 12 to warm above ambient temperature. Therefore, some of the heating effect is also probably due to pressure changes in the flowing material and energy dissipated from shock waves.

As best understood at this time, RD mill 10 causes matter to break into smaller particles by creating pressure changes, including shock waves, that cause the natural elasticity of the matter-to be exceeded. The pressure changes are created at regular frequencies related to the rotational frequency of the rotor assembly and to the number of vanes on the rotors, the number of sides of the housing, the number of support pins, and the number of stages. Of these factors, the rotational frequency can be varied most easily to obtain optimum performance for disintegrating a given form of matter. The optimal disintegration frequency will vary among different crystalline compounds as different substances have different natural resonances. Furthermore the size of the particles resulting can be varied by generating frequencies that will shatter the crystal only to a given mean size, thus different size particles of the same crystalline compound can be produced. In contrast, percussion methods such as ball mills do not offer this level of control. RD is not the random process characteristic of impact types of pulverization.

Producing Small Particles of PAM

Figure 14A:
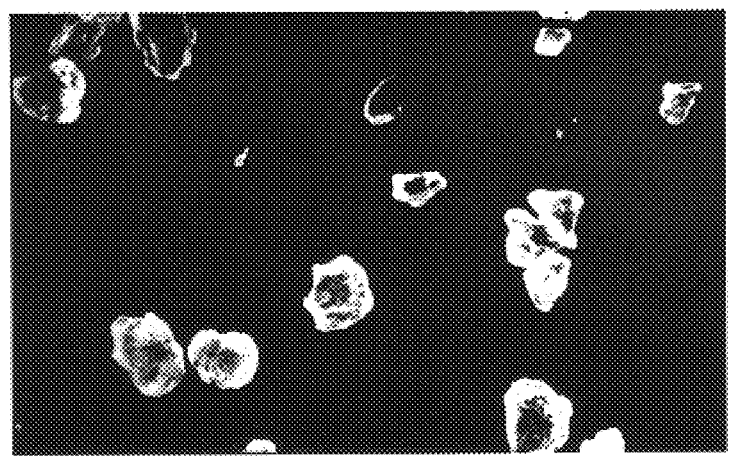
FIGS. 14A, 14B, and 14C are 80X photomicrographs taken with Nomurski optics of flowable water-soluble PAM particles according to one aspect of the invention, in which commercial PAM particles, as shown in FIG. 1A, have been reduced in size by the mill shown in FIGS. 2–13. The PAM in FIG. 14A is from a +150, −100 mesh screening of the mill product; the PAM in FIG. 14B is from a +270, −150 mesh screening; and the PAM in FIG. 14C is from a −270 mesh screening.
Figure 14B:
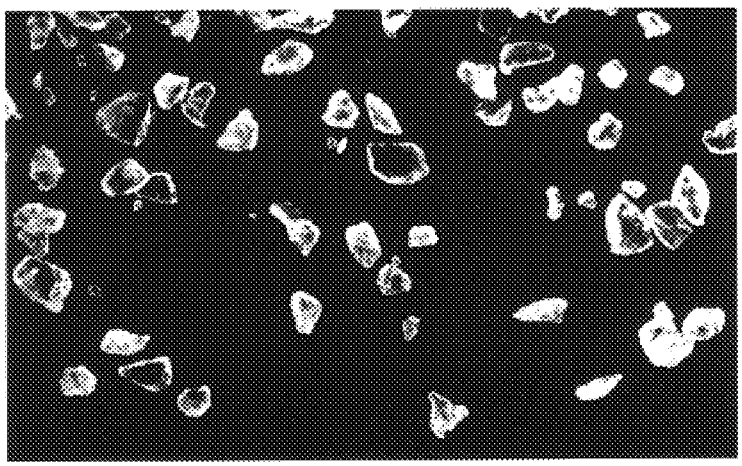
Figure 14C:
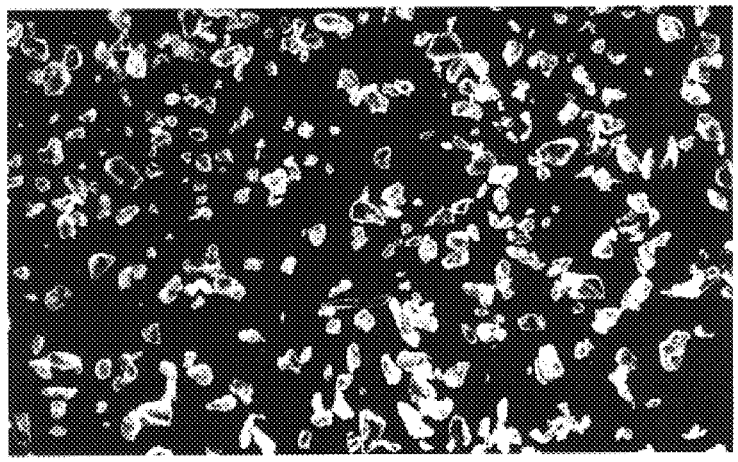

As mentioned above, RD mill 10 produces small particle size, e.g. –100 mesh, water-soluble PAM without significantly impairing either its flowability or its ability to improve soil. Electron micrographs of samples of the pulverized PAM particles are shown in FIGS. 14A, 14B, and 14C, which respectively show +150, –100 mesh, +270, –150 mesh and –270 mesh screenings of the pulverized product. The particles, although markedly reduced in size from the larger commercial grade particles, appear crystalline with smooth, flat faces. When observed with an optical microscope, at least about 90% of the particles appear transparent. These particles will go into solution in tap or distilled water in about 10 seconds or less, producing a clear, viscous liquid with no visible residue of undissolved particles. The viscosity of the solution is very high, which is indicative of the presence of high molecular weight polymeric molecules.

Figure 1B:
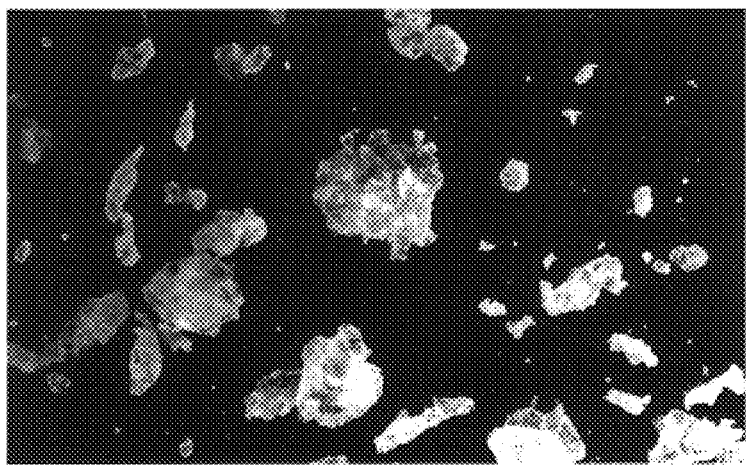
Figure 1C:
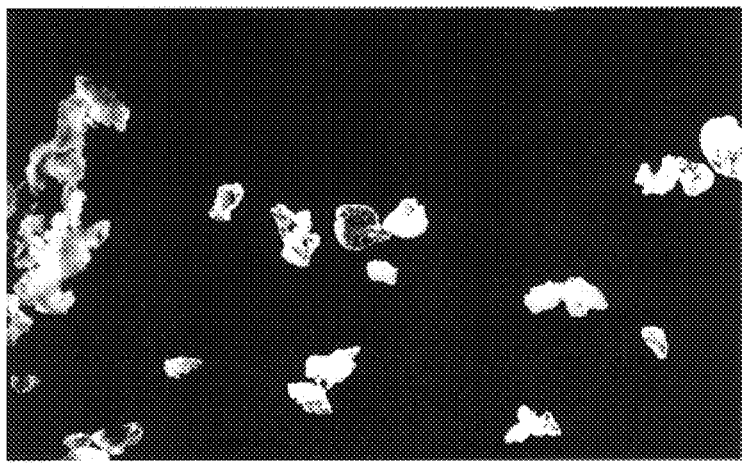

In contrast, when commercial grade PAM particles were processed in a ball mill the resultant smaller particles of variable size were opaque instead of translucent, with rough rather than smooth, planar surfaces (FIG. 1B). The ball milled particles do not dissolve in water as readily—they tend to clump. Similarly, small particles screened from commercial grade PAM do not completely dissolve in plain water even after 10–30 minutes. When dissolved, the solution made from the ball milled PAM has less viscosity, indicative that the large polymeric molecules broke into smaller fragments.

Thus, it appears that RD mill 10 preferentially fractures the polymeric material along the planes of the crystals rather breaking the molecules. Evidence of this includes the highly transparent and faceted appearance of the milled PAM particles and the high viscosity of solutions produced with the particles. In addition, neither the ball milled PAM-nor the screened fines essentially all go into solution in plain water, as do the milled PAM particles.

It is believed that the granules introduced into RD mill 10 flow in a Coanda flow substantially without impacting on the rotor assembly, the orifice plates or the interior sides of the housing. While entrained in the Coanda flow, the material is subjected to rapid pressure increases and decreases. As described in greater detail below, RD mill 10 processes the PAM most efficiently when operated at a particular rotational speed. It is believed that operating at this rotational speed subjects the flowing PAM particles to pressure changes at a natural resonant frequency for breaking the intermolecular bonds which bind PAM molecules to each other.

We have used RD mill 10 to produce small particle size water-soluble PAM as detailed in Table 1. In each test, the feed stock material was water soluble PAM granules with a molecular weight of about 15–22 million a.u., and a particle size of about −25, +40 mesh. The PAM was obtained from SNF of Savannah, Ga.

In each test, three of the four fabric socks 216 of RD mill 10 were blocked off at tubes 214. The rotor assembly 38 was brought up to a steady rotational speed prior to feeding any PAM feed stock granules into feed chute 78. The rotational speed and motor power consumption under this condition are indicated as "Static" in Table 1. RD mill 10 was run for a time sufficient for housing 12 to become warmed above ambient temperature, but still slightly cool to the touch. Then the feed stock PAM granules at ambient temperature (about 45–65° F., or 6–18° C.) were poured into feed chute 78 from a 40 pound supply. The feed rate was increased until the motor power reached an approximately steady state operational level, which typically takes about 10–15 seconds. The operational steady state rotational speed and power levels are indicated as "Steady State" in Table 1. The steady state rotational speed was stable within a range of about +/−3 RPM. The feed rate was held at the steady state rate until the feed stock supply was depleted. Flow rate was determined from the measured time to empty the 40 pound supply for each run. The pulverized product was slightly warm to the touch. We estimate that the temperature of the pulverized PAM product was less than about 115° F. (46° C.), which is not warm enough to change the character of the PAM.

Table 1 also indicates the percentages of product of different sizes produced under steady state conditions. Material produced prior to reaching steady state conditions was separated from that produced in steady state conditions, and was not further tested.

TABLE 1

| Rotor Speed (RPM) (Static) | 3226 | 3250 |
|---|---|---|
| Rotor Speed (RPM) (Steady State) | 3175 | 3225 |
| Power (amps) (Static) | 17 | 24 |
| Power (amps) (Steady State) | 35 | 31 |
| Flow Rate (pounds/minute) | 12 | 25 |
| +100 mesh (>150 μm) | 82.2% | 47.9% |
| −100 to +150 mesh (106–150 μm) | 7.7% | 21.5% |
| −150 to +270 mesh (53–106 μm) | 4.9% | 17.7% |
| −270 mesh (<53. μm) | 5.2% | 12.9% |

Results of two different test runs for producing small PAM with an RD mill.

PAM in the range of sizes between about −100 and +270 mesh are the most useful for producing aqueous solutions and for dry application to soils. The molecular weight of the PAM molecules in particles in the −100, +270 mesh size range is essentially the same that of the feed stock material. The milled particles are flowable and retain their soil conditioning properties. When observed using an optical microscope with Nomurski optics, about 90% or more of these particles appear substantially transparent, and flat crystal faces are clearly visible, as seen in FIGS. 14A–C. The smallest particles (about −270 mesh) are a little more irregularly shaped, and their surfaces are more roughened (see FIG. 14C). This reduces the flowability of the smallest particles somewhat.

The rotors of the described RD mill 10 can be rotated at speeds of about 3000 RPM or greater to produce small particle size PAM. Our experimental results summarized in Table 1 indicate that the process of producing the small particle PAM is very sensitive to the rotational speed of the RD mill rotor assembly. Clearly, running with a steady state rotor speed of 3225 RPM is more efficient in terms of power consumption and throughput, and also produces a better quality product. As best understood at this time, the dramatic difference in output between these two tests, which was obtained with an apparently slight difference in rotational speed, resulted because the 3225 RPM speed was tuned to a natural resonant frequency for disintegrating PAM particles and the other speed was not. The frequency of the pressure pulses created within RD mill 10 is directly related to the rotational speed of the rotors. Operating on a resonance peak enhances throughput and reduces power consumption because more of the energy of the mill is absorbed by the particles. From a practical point of view, however, the most efficient operating conditions can be determined experimentally.

Although we have not observed excessive temperatures in our short test runs, it is possible that longer production runs may cause RD mill 10 to warm to an undesirable temperature for producing small particle size, water-soluble PAM. In that case, RD mill 10 can be cooled, for example with a water jacket (not shown) located between housing 12 and shield 14. However, it is not necessary to freeze or otherwize cool the particles fed into RD mill 10, as is typically done when grinding PAM.

When material with some water content is processed by RD mill 10, the processed product will generally have a reduced water content. It is believed that the water content of water-soluble PAM is also reduced when processed by RD mill 10. This may be a factor contributing to the increased flowability of the PAM processed by RD mill 10, and its reduced tendency to clump.

We tested this hypothesis by measuring the water content of different types of PAM samples. Table 2 summarizes the results. For each sample, a small amount was placed in an open container, which was then weighed with the sample. The container with the sample was then placed in a cabinet and heated to 115° C. for three hours. The cabinet was vented through a small tube to air during the heating. The container was then weighed again with the dried sample. All samples were stored prior to measuring in closed containers. However, these closed containers were opened occasionally to remove some of their content.

TABLE 2

| SAMPLE | Start Weight (gm) | Final Weight (gm) | % Water content |
|---|---|---|---|
| Commercial +40, −25 mesh | 0.8925 | 0.7768 | 12.96 |
| Screened −150 mesh | 0.3823 | 0.3147 | 17.68 |
| RD Milled −150 mesh | 0.5965 | 0.5087 | 14.72 |

TABLE 2-continued

| SAMPLE | Start Weight (gm) | Final Weight (gm) | % Water content |
|---|---|---|---|
| RD Milled −270 mesh | 0.5079 | 0.4463 | 12.12 |

Water content of different samples of PAM particles

This simple test shows that the water content of RD milled PAM particles is significantly less than the water content of particles screened from the commercial grade large particle PAM, by about 16–30%.

RD mill 10 can also be used to produce small particles of gypsum or other additives that can be mixed with the small particle PAM. RD mill 10 produces 96% −325 mesh gypsum particles from feed stock of about +30 mesh to about ⅜ inch (0.9 cm) gypsum (80% calcium sulfate anhydrite) when run at about 3000 rpm.

Producing Rapid Solutions of PAM

The invention also provides procedures to dissolve water-soluble PAM essentially completely into solution within about 10 seconds or less, with PAM concentrations of at least about 0.5% by weight. Resulting concentrations of PAM are high enough to be of practical use as a stock solution, for example, in the field for addition to irrigation water for soil conditioning. Thus, the need for an aging step is eliminated.

According to this method, small particle, water-soluble PAM having a particle size of about −100 mesh or smaller is stirred into a concentrated solution of a salt, which can be a divalent or monovalent cation salt, and preferably a calcium salt. Alternatively, the reverse order also works, in which the concentrated solution of the salt is mixed with the dry PAM particles. A stock solution having about 0.5–1.5% PAM by weight is prepared by diluting the resulting solution with water.

The particle size of water-soluble PAM used for making the solution is approximately −100 mesh. More preferably, PAM particles used in this process are in the size range of about −100 to +270 mesh, and even more preferably in the size range about −150 to +270 mesh. While PAM particle sizes smaller than about 270 mesh are usable, we have observed that particles of this size range, when used alone, are somewhat less effective for soil conditioning. It is believed that this may be due to a slightly reduced flowability. It is also possible that the molecular weight of some of the PAM molecules in the smallest particles is reduced.

Small PAM particles appropriate for producing stock solutions can be produced in bulk quantities by RD mill 10. Small PAM particles produced by RD mill 10 are easy to work with because of their high flowability compared with similarly sized particles produced by other means. Particles produced by RD mill 10 also do not have as much of a tendency to clump together as particles produced by other means. These properties could be attributable, at least in part, to a reduced water content. As described above, RD mill 10 can drive moisture out of a material as it reduces the size of the material. Another factor contributing to the excellent flowability of the milled particles is that they generally have clean, regular surface features, such as the flat faces. The flowability and non-clumpiness of PAM produced by RD mill 10 allows it to be easily screened to produce particles in a desired size range. These properties also allow the PAM particles to be accurately metered in an automated or non-automated system. In addition, small PAM particles produced by RD mill 10 retain their soil conditioning properties better than do ground PAM particles, and so less is needed to condition a given amount of soil. For these, and other reasons, small PAM particles produced by RD mill 10 are preferred over small particle PAM produced by other means, such as grinding, or screened fines from production of larger size granules.

Water-soluble PAM which has been reduced in particle size by RD mill 10 also readily goes into solution in plain water. Concentrations of water-soluble PAM in plain tap water or in distilled water of up to about 5,000 ppm (0.5%) by weight can be obtained.

Divalent calcium salts are preferred because they help bind PAM molecules together in solution. Of the divalent salts, calcium salts are preferred because calcium is also usefull as a soil conditioner, both with and without PAM. For calcium salt solutions, the calcium molarity before adding PAM is in the range of about 0.17 to about 4.0. The solutions of calcium salts that can be used include calcium nitrate (11% calcium), calcium thiosulfate (11–12% calcium), calcium chloride (12–13% calcium), and other calcium salts. Gypsum can also be used in a slurry. The commercial compound called CAN17 (8.8% calcium), which contains calcium nitrate and ammonium nitrate, can also be used.

The rapid solution of small PAM particles in solutions of calcium salts is an unexpected effect and very advantageous. It never occurs with standard-sized water-soluble PAM granules, which do not go into full solution with concentrated calcium nitrate alone in less than a few days. Calcium coats the surfaces of large particles of water-soluble PAM and hinders their going completely into solution. For this reason, the industry does not use calcium salts with water-soluble PAM.

After immediate solution of water-soluble PAM in a concentrated calcium salt solution, water is then added to dilute the solution to a stock solution of about 0.5% to 2.0% PAM, and preferably about 1% water-soluble PAM by weight. Alternatively, the calcium solution may be diluted before the PAM is added. Lower and higher concentrations of water-soluble PAM can also be used. Dry forms of the calcium salts may also be used instead of solution calcium by adding appropriate amounts of water.

Concentrated calcium chloride (12–13% calcium) reacts the same way as calcium nitrate. Calcium thiosulfate also does this but it may be slightly less effective for improving soil than the other calcium salts. The commercial compound called CAN17 (8.8% calcium) is slightly less effective for this use.

Solutions of PAM made with other divalent cation salts, such as magnesium nitrate and magnesium chloride, may be used to prepare an instantaneous solution of water-soluble PAM. However, neither are commonly used in agriculture. In addition, magnesium binds less strongly to clay and to water-soluble PAM than does calcium.

Solutions of PAM made with high concentrations of some monovalent cation salts also can be used to give near instantaneous solution of fine-sized water-soluble PAM. Monovalent salts that can be used include potassium salts, sodium salts, and ammonium salts, including many mixed fertilizers. These PAM solutions are not as efficient as those prepared with calcium salts, but are more effective than using water alone to dissolve PAM. It is possible to achieve water-soluble PAM concentrations of about 10,000 to 15,000 ppm (mg/liter) or more in solutions with fertilizers or soil amendments, in contrast to conveniently around 3,000 ppm in water alone. For example, PAM solutions of about 1.5% by weight can be achieved when dissolving PAM into potassium salts. Monovalent cation salts do not increase the effectiveness of the water-soluble PAM to improve soil like calcium does because the monovalent salts cannot bridge molecules of water-soluble PAM together or to clay like calcium does.

PAM solutions made according to the above described methods, and in particular the solutions made with calcium salts, can be additionally fortified with fertilizers, such as potassium nitrate, ammonium nitrate, potassium chloride and urea ammonium nitrate. Ammonium sulfate and ammonium phosphate, which precipitate calcium, should not be used with the calcium-PAM solution. At least some of the fertilizer can be added to the salt solution before adding the PAM, and the remainder of the fertilizer can be added afterwards, for example when the solution is diluted to make the stock solution, or when the stock solution is combined with irrigation water. Properties of PAM solutions with fertilizers is described in in U.S. Pat. No. 4,797,145, the entire disclosure of which is included herein by reference.

PAM solutions according to the invention can also be combined with gypsum into a slurry. If the gypsum is used as the calcium salt source, then a suspension of gypsum, which has some dissolved calcium, is stirred as small particle size PAM is added to the slurry. PAM particles produced by RD mill 10 go into solution nearly instantaneously in a gypsum slurry, essentially all within about 10 seconds, even without the use of other calcium salts. It is possible to achieve concentrations of up to about 16,000 ppm PAM in gypsum slurries on a weight PAM/volume solution basis. Gypsum can also be added to a stock solution, which has been prepared with other salts, with a solution gypsum machine.

Soil Conditioning with PAM

The 1% and other stock solutions of water-soluble PAM can be injected into irrigation lines with appropriate dilution ratios to give desired final concentrations for uses on soil. The amounts of calcium nitrate, calcium chloride, calcium thiosulfate, and other salts used with water-soluble PAM can be varied to accommodate different farm and landscape uses.

An important aspect of the discovery is that water-soluble PAM and calcium combinations prepared this way greatly increase the efficiency of the water-soluble PAM to improve soil. This effect was also totally unexpected. Examples of increased efficiency are shown in Table 3. For the soil tests summarized in Table 3, PAM in solution was added to a soil suspension until the suspension flocculated. A description of the testing methodology is in "Soil Tests To Determine Application Rates For Polymeric Soil Conditioner's," Wallace et al., in Soil Science, V. 141, No. 5, pp. 390–394, May 1986. However, somewhat lower concentration PAM solutions were used for the tests described herein. Note that the small particle, water-soluble PAM used for making the solutions described in Tables 3–5 was provided by a commercial source from −100 mesh screenings of larger size granules (+40 mesh), and not produced by RD mill 10.

TABLE 3

| Soil Number | Conventional procedure with gypsum added separately | With calcium nitrate; Ca: water-soluble PAM = 0.67 | With calcium nitrate; Ca: water-soluble PAM = 1.34 |
| --- | --- | --- | --- |
| 1 | 90 (40.9) | 30 (13.6) | 16 (7.3) |
| 2 | 80 (36.3) | 30 (13.6) | 10 (4.5) |
| 3 | 24 (10.9) | 10 (4.5) | 8 (3.6) |
| 4 | 17 (7.7) | 8 (3.6) | 5 (2.3) |
| 5 | 12 (5.4) | 6 (2.7) | 2 (0.9) |

Pounds (kg) of water-soluble PAM needed for creation and protection of water-soluble aggregates in 0.5 foot–acre (6.2 cm-hectare) to a depth of 0.5 ft (15 cm) of some soils.
Soil #1 is a clay soil; #2 is a clay loam; #3 is a loam; #4 is a loam; #5 is a loamy sand.

Table 3 also shows that additional calcium nitrate enhances the effectiveness of water-soluble PAM. The ratio for calcium/water-soluble PAM of 0.67 is one half gallon (1.89 liters) of calcium nitrate (9-0-0-11% calcium) per pound of water-soluble PAM and the ratio of 1.34 is one gallon of calcium nitrate per pound of water-soluble PAM.

A mechanism exists to enhance the effectiveness of these calcium salt plus PAM solutions for improving soil properties. These calcium salts are about 200 times as soluble as is gypsum and, therefore, there is much more bridging of divalent calcium with the water-soluble PAM to more effective molecular weight which already is 15–22 million. Many water-soluble PAM molecules are bound together by the calcium to enhance their ability to soil.

Table 4 provides data somewhat similar to Table 3. The small size PAM particles used for making the solutions used in these tests were not produced by RD mill 10. The name for the combination of water-soluble PAM and calcium salts is abbreviated as "Cal-PAM". The data compare co-use of gypsum with a conventional solution of water-soluble PAM and also with a Cal-PAM solution. Co-use of gypsum improves the performance of both conventional water-soluble PAM and Cal-PAM. But Cal-PAM in 0.7 dS/m (decisiemens per meter) water performed better than conventional water-soluble PAM in 2.3 dS/m water (gypsum solution). Table 5 presents the data of Table 3 as parts per million (mg/liter) of Cal-PAM for irrigation.

TABLE 4

| Soil Number | PAM with DI water (EC = 0.07 dS/m) | PAM with tap water (EC = 0.7 dS/m) | PAM with gypsum solution (EC = 2.3 dS/m) | Cal-PAM with tap water (EC = 0.7 dS/m) | Cal-PAM with gypsum solution (EC = 2.3 dS/m) |
| --- | --- | --- | --- | --- | --- |
| 6 | 46 (20.9) | 28 (12.7) | 16 (7.3) | 7 (3.2) | 5 (2.3) |
| 7 | 40 (18.2) | 26 (11.8) | 17 (7.7) | 8 (3.6) | 4 (1.8) |
| 8 | 32 (14.5) | 16 (7.3) | 14 (6.4) | 4 (1.8) | 3 (1.4) |

Pounds (kg) of water-soluble PAM needed per 0.5 foot–acre of soil for creation and protection of water-stable aggregates in soil. Calcium/water-soluble PAM ratio for the Cal-PAM was 1.34.
"EC" is electric conductivity;
"DI" is de-ionized.
Soil #6 is a clay soil; #7 is a loam; and #8 is a sandy loam.

Table 5 shows the data of Table 4 converted to parts per million (mg/liter) PAM in solution for irrigation.

TABLE 5

| Soil Number | PAM with DI water (EC = 0.07 dS/m) | PAM with tap water (EC = 0.7 dS/m) | PAM with gypsum solution (EC = 2.3 dS/m) | Cal-PAM with tap water (EC = 0.7 dS/m) | Cal-PAM with gypsum solution (EC = 2.3 dS/m) |
|---|---|---|---|---|---|
| 6 | 202/57 | 123/35 | 70/20 | 30/9 | 22/6 |
| 7 | 176/50 | 114/33 | 62/18 | 35/10 | 18/5 |
| 8 | 140/40 | 70/20 | 62/18 | 18/5 | 13/4 |

Parts per million (mg/liter) of water-soluble PAM in treatment solution for 1 inch/3.5 inch (2.54 cm/8.9 cm) of irrigation water per acre (0.405 hectare).

Tables 6 and 7 show amounts of water-soluble PAM (WS-PAM) produced by RD mill 10 used for conditioning three soil types.

TABLE 6

| Soil | WS-PAM with tap water | WS-PAM with gypsum slurry | WS-PAM with 18-0-8 fertilizer solution |
|---|---|---|---|
| Holtville | 19 (8.6) | 4 (1.8) | 11 (5.0) |
| Aiken | 16 (7.3) | 4 (1.8) | 8 (3.6) |
| Yolo | 15 (6.8) | 4 (1.8) | 6 (2.7) |

Pounds (kg) of −150 to +270 mesh water-soluble PAM produced by RD mill 10 needed to effectively flocculate 0.5 foot–acre (6.2 cm-hectare) of some soils.

TABLE 7

| Soil | WS-PAM with 6-0-5-6Ca fertilizer solution | WS-PAM with CAN-17 | WS-PAM with Ca(NO$_3$)$_2$ | WS-PAM with commercial liquid soil additive |
|---|---|---|---|---|
| Holtville | 7 (3.2) | 10 (4.5) | 6 (2.2) | 12 (5.5) |
| Aiken | 5 (2.3) | 7 (3.2) | 5 (2.3) | 10 (4.5) |
| Yolo | 4 (1.8) | 5 (2.3) | 4 (1.8) | 6 (2.7) |

Pounds (kg) of −150 to +270 mesh water-soluble PAM produced by RD mill 10 needed to effectively flocculate 0.5 foot–acre (6.2 cm-hectare) of some soils.

Holtville soil is a typic Torrifluvent (a clay, pH 8); Aiken is a mesic Xeric Haplohumults (a loam); and Yolo is a fine, silty mixed typic Xerofluvents (a loam, pH 6). The clay in Holtsville is predominantly montmorillonite, that in Aiken is predominantly kaolinite, and that in Yolo is both montmorillonite and kaolinite almost equally.

Using a solution produced with particles of water-soluble PAM of different sizes provides more efficient soil conditioning than does a solution produced with a more narrow size range. Table 8 provides data from tests on the Yolo and Holtville soil samples. The 50% −100 mesh commercial, 50% −270 mesh pulverized sample was more effective than solutions produced with either the pure −100 mesh commercial or the pure −270 mesh pulverized samples alone.

TABLE 8

| Particle Size | Yolo | Holtville |
|---|---|---|
| −100 (commercial) | 3 (1.4) | 6 (2.7) |
| −100 to +150 (RD mill) | 1.5 (0.7) | 4 (1.8) |
| −150 to +270 (RD mill) | 2.2 (1.0) | 5 (2.3) |
| −270 (RD mill) | 7.0 (3.2) | 19 (8.6) |
| 50% −100 (commercial) 50% −270 (RD mill) | 2.2 (1.0) | 5 (2.3) |
| Average −270 (RD mill) and −100 (commercial) | 5.1 (2.3) | 12 (5.4) |

Pounds (kg) of water-soluble PAM, of different sizes and produced by different processes, in a calcium nitrate solution needed to effectively flocculate 0.5 foot–acre (6.2 cm-hectare) of two different soils.

Table 8 also clearly shows that solutions produced with PAM particles reduced in size by RD mill 10 (−100 to +150 mesh) are significantly more effective for soil conditioning than solutions produced with screened commercially obtained particles of a similar size range (−100 mesh). However, there was some loss of effectiveness when solutions produced with pulverized particles of −150 to +270 mesh were used when compared to solutions produced with the −100 to +150 mesh pulverized particles. The solution produced with −270 mesh pulverized particles was least effective for soil conditioning, but when combined with larger particles the combination was advantageous. This is similar to the effect reported by Wallace and Wallace (1989) when PAM and a low molecular weight polysaccharide were used together.

The 1% and near 1% concentrated solutions of Cal-PAM can have a long shelf-life stability if they are not exposed to sunlight. We have observed no significant loss of stability for such solutions for many months. However, when the one percent solutions are diluted to lower concentrations such as to 0.01 percent or lower, the additional effectiveness of Cal-PAM partially disappears after several days. This is because when dilute, the calcium to water-soluble PAM binding tends to become loose or weaker. The use of Cal-PAM is not hindered by this phenomenon because it usually reaches the soil in the field almost immediately (seconds or minutes) after dilution to concentrations much lower than one percent.

Ratios of Ca:water-soluble PAM higher than 1.34:1 can easily be prepared with some advantages. More calcium is applied to soil. The enhanced effectiveness for soil conditioning is even more pronounced. When the calcium and water-soluble PAM are mixed followed by some addition of water, additional calcium solutions and other salt solutions can be added to reach the final volume wanted (usually to make a 1.0 percent solution of water-soluble PAM). The CAN17 solution can be used in this procedure to increase the Ca:water-soluble PAM ratio above 1.34.

The water-soluble PAM solutions made with calcium salts are more efficient for soil conditioning than those produced with fertilizer salts, which in turn are more effective than solutions of PAM in water alone. Slurries of water-soluble PAM with gypsum are nearly as effective as the solutions made with calcium salts (see, e.g., Table 6). Co-application with calcium salts (nitrate, chloride, thiosulfate, sulfate, and others) can at least double the effectiveness of water-soluble PAM. Water-soluble PAM is more effective for soil conditioning when mixed with fertilizers because the salinity (EC) is somewhat higher. The heightened effectiveness of small particle size, water-soluble PAM when used with calcium salts and gypsum were not expected.

The finely sized, high quality PAM and gypsum particles produced by RD mill 10 make possible efficient dry and wet application of both. Dry application of water-soluble PAM with gypsum gives rapid solution of both the water-soluble PAM and the gypsum in the soil. Application of water-soluble PAM with gypsum in a slurry with solution gypsum machines is possible only with fine sized particles of each. The co-use of gypsum and water-soluble PAM on compacted soil is effective because the gypsum improves the soil permeability and the water-soluble PAM preserves and protects the small micropore spaces and channels created by the gypsum. The thixotropic-like effect of the mixture to become a flowable-liquid was unexpected. Stirring keeps the mixture in liquid form.

The gypsum/water-soluble PAM slurry can be used for applying variable amounts of water-soluble PAM to soil. Different slurry blends can be used variously for soil preparation and for enhancing crop performance and water use efficiency. The application can be made with most solution gypsum machines currently being used in soil improvement, for example, a Turbo Mix machine produced by Montague/Fisher Inc. of Visalia, Calif.; and an AG Pro machine produced by Western Minerals Inc. of St. George, Utah.

For dry application to soil, particles of water-soluble PAM are blended with solution grade gypsum of similar size (+270 to −200 mesh), or smaller size (−270 mesh). Gypsum of −325 mesh particle size, which is more soluble than larger particles, can be produced by RD mill 10. Both the water-soluble PAM and the gypsum particles produced by RD mill 10 rapidly go into solution when contacted by water in the soil. The commercial particle sizes of PAM do not do this because they dissolve too slowly and are too large to blend with the solution-grade gypsum particles. Other additives, such as fertilizer and calcium salts, can also be mixed with the dry gypsum/water-soluble PAM blend.

Stock solutions of around 1.5% down to 0.5% water-soluble PAM in calcium salt solutions may also be used conveniently for erosion control with furrow irrigation. Since the effectiveness is enhanced from 2 to 6 times by the water-soluble PAM-calcium binding, solutions of from ¼ to 2 parts per million (mg/kg) PAM can control the majority of the erosion from furrows. From 1 to 5 gallons (3.78 to 18.9 liters) of the 1 percent stock solution are injected into ½ to 1 acre-inch of irrigation water to obtain the effect.

This procedure also decreases to almost insignificance the amount of water-soluble PAM in irrigation water escaping from a field in runoff or tail water that escaping from a field is considered as an environmental problem (probably erroneously) when 10 parts per million water-soluble PAM are used in furrows in conventional procedures.

A more favorable Ca:water-soluble PAM ratio for erosion control in furrow irrigation and other purposes is created by-use of a more concentrated calcium solution or with less water-soluble PAM. A Ca:water-soluble PAM ratio of up to 32:1 or more with about 0.125 or less pounds water-soluble PAM per gallon of stock solution improves the effectiveness of furrow-erosion control and also gives some improvement of physical properties of soil.

Less than about 10 ppm application rates of water-soluble PAM to control furrow irrigation are possible with this procedure. For example, erosion control in furrows can be achieved this way with water-soluble PAM rates as little as 0.25–0.5 ppm in irrigation streams in contrast to conventional procedures of between 1 and 10 ppm. Appropriate solutions can be made with calcium nitrate, calcium chloride, CAN17 and combinations of them. Such solutions are also useful for soil application in liquid form to control dust erosion.

If stock solutions with the 30% kerosene PAM are wanted or needed, they can be prepared with direct addition of the 30% kerosene PAM into the concentrated calcium solutions to make stock solutions of up to about 7,500 ppm PAM. These preparations should not be stored but should be injected directly into irrigation lines. This procedure will not work to make a 1% PAM solution as a gel forms.

Although the detailed description of preferred embodiments describes the enhanced effectiveness of solutions of water-soluble PAM with calcium salts, other large molecular weight water-soluble polymers are believed to have their effectiveness enhanced when small particle sizes of these materials are dissolved in calcium salt solutions, or applied to soils dry with small particle gypsum or other calcium salts. Other water-soluble polymers used for soil conditioning, such as polyvinyl alcohol, polyacrylate, polyacrylonitrile, vinylacetate maleic acid, and others, may be substituted for water-soluble PAM in the methods described herein.

Presently, only about 1% of all water soluble PAM is used for soil conditioning. Because of its easy solubility and flowability, the small particle size, PAM produced by RD mill 10 may be used advantageously for other purposes. For example, water soluble PAM is presently used for water purification, to help dewater sewage sludge, to clarify turbidity in foods such as fruit juices and wine, in oil drilling, and in paper manufacturing. Processes would benifit in these and in other industries by using the flowable, more soluble form of PAM described herein.

The scope of the invention should be determined by the appended claims and their legal equivalents, rather than only by the examples given.

What is claimed is:

1. A method of producing an aqueous solution of water-soluble polyacrylamide (PAM) with a concentration of at least 5 grams per liter, comprising:

providing a monovalent or divalent cation salt solution; and adding sufficient particles of the PAM, which are characterized by a particle size of about −100 mesh, to the salt solution such that the particles are essentially all dissolved within about 10 seconds and such that the resulting solution has a PAM concentration of at least 5 grams per liter.

2. The method of claim 1, wherein the monovalent or divalent cation salt solution comprises a calcium salt solution.

3. The method of claim 2, wherein the ratio of calcium:PAM is between about 0.5 and 2.

4. The method of claim 2, wherein the calcium salt comprises a member of the group consisting of calcium nitrate, calcium thiosulfate, and calcium chloride.

5. The method of claim 1, wherein adding the PAM particles includes stirring or agitating the solution while adding the PAM particles.

6. The method of claim 1, wherein the salt solution further comprises a fertilizer.

7. The method of claim 1, wherein the salt solution includes gypsum particles.

8. The method of claim 1, wherein the PAM particles are further characterized by a particle size that is about +270 mesh.

9. An aqueous stock solution for soil treatment, comprised of water-soluble polyacrylamide (PAM) with a concentration of at least about 5 grams per liter and a calcium salt, wherein the solution has a calcium to PAM ratio that is at least about 0.5.

10. The stock solution of claim 9, wherein the calcium salt comprises a member of the group consisting of calcium nitrate, calcium thiosulfate, calcium sulfate, and calcium chloride.

11. The stock solution of claim 9, wherein the calcium:PAM ratio is about 1.0 to about 32.

12. A method of soil conditioning, comprising:
- providing an aqueous stock solution comprised of water-soluble polyacrylamide (PAM) with a concentration of at least about 5 grams per liter and calcium with a calcium:PAM ratio of at least about 0.5;
- mixing the stock solution with additional water to make a diluted solution; and
- applying the diluted solution to an area of soil.

13. The method of claim 12, wherein applying the diluted solution includes spraying the diluted solution through one or more nozzles of an irrigation system.

14. The method of claim 12, further comprising adjusting the ratio of calcium to PAM (Ca:PAM) in the diluted solution to be between about 0.5:1 and 32:1 prior to applying the diluted solution to the soil, wherein the diluted solution has a PAM concentration of less than 0.5 parts per million, and wherein applying the diluted solution includes running the diluted solution into a furrow.

15. The method of claim 12, wherein the diluted solution further comprises a member selected from the group consisting of a fertilizer and gypsum.

\* \* \* \* \*